US009525204B2

(12) United States Patent
O'Keeffe et al.

(10) Patent No.: US 9,525,204 B2
(45) Date of Patent: Dec. 20, 2016

(54) WIRELESS NETWORK ELEMENT AND METHOD FOR ANTENNA ARRAY CONTROL

(75) Inventors: Conor O'Keeffe, Douglas (IE); Joe Moore, Terenure (IE)

(73) Assignee: Analog Devices Global, Hamilton (BM)

( * ) Notice: Subject to any disclaimer, the term of this patent is extended or adjusted under 35 U.S.C. 154(b) by 511 days.

(21) Appl. No.: 13/382,616

(22) PCT Filed: Jun. 15, 2010

(86) PCT No.: PCT/EP2010/058402
§ 371 (c)(1),
(2), (4) Date: Mar. 16, 2012

(87) PCT Pub. No.: WO2011/003701
PCT Pub. Date: Jan. 13, 2011

(65) Prior Publication Data

US 2012/0196591 A1 Aug. 2, 2012

(30) Foreign Application Priority Data

Jul. 6, 2009 (GB) .................................. 0911694.8

(51) Int. Cl.
*H04W 4/00* (2009.01)
*H01Q 3/26* (2006.01)
(Continued)

(52) U.S. Cl.
CPC ............ *H01Q 3/2605* (2013.01); *H01Q 1/246* (2013.01)

(58) Field of Classification Search
CPC .... H01Q 1/246; H01Q 3/2605; H01Q 25/002; H01Q 21/061; H01Q 3/2611; H04B 7/0491; H04B 7/0825; H04B 7/088; H04W 16/28; H04L 2025/03426
(Continued)

(56) References Cited

U.S. PATENT DOCUMENTS 4,317,229 A * 2/1982 Craig et al. ................ 455/277.1
5,889,494 A 3/1999 Reudink et al.
(Continued)

FOREIGN PATENT DOCUMENTS

CA EP-1458205 * 9/2004
CN 1273463 11/2000
(Continued)

OTHER PUBLICATIONS

Chinese Notification of the First Office Action including Text Portion of the Notification of the First Office Action in English and Chinese Search Report, dated Dec. 2, 2013, Chinese Application No. 201080030393.0.
(Continued)

*Primary Examiner* — Timothy Pham
(74) *Attorney, Agent, or Firm* — Knobbe, Martens, Olson & Bear, LLP

(57) ABSTRACT

A wireless network element is operably couplable to an antenna array for communicating with at least one remote wireless communication unit. The antenna array comprises a plurality of radiating elements where at least one first radiating element of the plurality of radiating elements is arranged to create a radiation pattern in a sector of a communication cell. The wireless network element comprises a receiver arranged to receive and process at least one signal from the at least one remote wireless communication unit via the at least one first radiating element. The wireless network element also comprises a beam scanning module for stepping/sweeping the radiation pattern through the sector of the communication cell, such that at least one signal from the at least one remote wireless communication unit is processed to identify signal parameters representative of incoming signal power and angle of arrival of the received at least one signal.

21 Claims, 14 Drawing Sheets

(51) Int. Cl.
*H01Q 1/24* (2006.01)
*H04W 24/00* (2009.01)

(58) Field of Classification Search
USPC ............................................. 455/427, 456.5
See application file for complete search history.

(56) References Cited

U.S. PATENT DOCUMENTS

| | | | | |
|---|---|---|---|---|
| 6,167,286 | A * | 12/2000 | Ward et al. | 455/562.1 |
| 6,304,214 | B1 | 10/2001 | Aiken et al. | |
| 7,072,669 | B1 * | 7/2006 | Duckworth | 455/456.1 |
| 7,072,692 | B1 | 7/2006 | Katz et al. | |
| 2001/0022557 | A1 * | 9/2001 | Rouphael et al. | 342/367 |
| 2002/0105928 | A1 | 8/2002 | Kapoor et al. | |
| 2003/0069047 | A1 * | 4/2003 | Kitahara | 455/562 |
| 2003/0195017 | A1 | 10/2003 | Chen et al. | |
| 2005/0053123 | A1 * | 3/2005 | Higuchi et al. | 375/148 |
| 2005/0101352 | A1 | 5/2005 | Logothetis et al. | |
| 2006/0158374 | A1 | 7/2006 | Rahamin et al. | |
| 2008/0026763 | A1 * | 1/2008 | van Rensburg et al. | 455/446 |
| 2008/0153502 | A1 * | 6/2008 | Park et al. | 455/446 |
| 2009/0191866 | A1 * | 7/2009 | Flore et al. | 455/434 |
| 2009/0262035 | A1 * | 10/2009 | Gonikberg | 343/757 |
| 2009/0273517 | A1 * | 11/2009 | Thiesen et al. | 342/372 |

FOREIGN PATENT DOCUMENTS

| | | |
|---|---|---|
| CN | 1402914 | 3/2003 |
| CN | 1411188 | 4/2003 |
| CN | 1553616 | 12/2004 |
| CN | 1589054 | 3/2005 |
| EP | 1050923 | 11/2000 |
| EP | 1801999 | 6/2007 |
| GB | 2363256 | 12/2001 |
| WO | 0051367 | 8/2000 |
| WO | 03023898 | 3/2003 |

OTHER PUBLICATIONS

Second Chinese Office Action issued by SIPO on Jun. 26, 2014 for corresponding Chinese application Serial No. 201080030393.0.
Third Chinese Office Action issued by SIPO on Nov. 4, 2014 for corresponding Chinese application Serial No. 201080030393.0.

* cited by examiner

1100

WIRELESS NETWORK ELEMENT AND METHOD FOR ANTENNA ARRAY CONTROL

FIELD OF THE INVENTION

The field of the invention relates to active antenna array control for use in a wireless communication system. In particular, the field of the invention relates to beam scanning using an antenna array to log user activity within a communication cell.

BACKGROUND OF THE INVENTION

Currently, 3rd generation (3G) cellular communication systems are being developed to further enhance the communication services provided to mobile phone UEs (user equipment). The most widely adopted 3rd generation communication systems are based on Code Division Multiple Access (CDMA) technology, namely Wideband Code Division Multiple Access (WCDMA). Carrier frequencies are used for uplink transmissions, i.e. transmissions from a mobile wireless communication unit (often referred to as wireless subscriber communication unit or UEs (in $3^{rd}$ generation systems) to the communication infrastructure via a wireless serving base station (referred to as a Node B in $3^{rd}$ generation systems) and downlink transmissions, i.e. transmissions from the communication infrastructure to the mobile wireless communication unit via a wireless serving base station (e.g. Node B). A further description of CDMA, and specifically of the Wideband CDMA (WCDMA) mode of Universal Mobile Telecommunication System (UMTS), can be found in WCDMA for UMTS', Harri Holma (editor), Antti Toskala (Editor), Wiley & Sons, 2001, ISBN 0471486876.

It is known that a cellular hierarchy consists of a macro cell for wide area geographic coverage and micro, pico and femto cells used for small localised coverage within the macro geographic structure. In some cases the micro, pico and femto cells may use the same frequency as that of the macro cell. Since the micro, pico and femto cells are used for in-fill coverage, their radiative antenna units will not be sharing the same physical site as the antennae used in the macro sector.

An example of a known cellular network plan 175 as often used in a macro cell deployment is illustrated in FIG. 1. The cellular network plan utilises cells 180 in a “honeycomb” structure, where a base station (Node B) would employ conventional (passive) antennas comprising multiple antenna elements to support communications within each cell. Cells are divided into sectors 185. Typically, three sectors exist per cell, corresponding to approximately 120° coverage per sector. One sector corresponds to a radiation pattern of a single conventional antenna whose horizontal azimuth beam pattern of +/−65° HPBW (Half Power beam width) maximally covers the sector. Outside of a main lobe of an antenna beam employed within the sector, the signals are spatially filtered and significantly attenuated. Conventional network planning and passive antenna array solutions process all incoming signals with a common fixed beam pattern. This receive processing, based on signals received within the geographic area identified by the antenna main lobe, tends to dictate a corresponding common beam pattern for transmitter operation. Thus, an identical radio frequency (RF) footprint is used for both receive (Rx) and transmit (Tx) operation.

Six sector cells, though less common, are utilised in some network configurations. CDMA and WCDMA technologies are able to use a single modulated RF carrier frequency for all uplink users on all cells and sectors within those cells. Likewise, a single carrier frequency is used for downlink on all cells in the network and all sectors within these cells. Furthermore, each sector antenna radio frequency (RF) signal is processed independently by its respective receiver or transmitter.

In conventional antenna systems for cellular communications, the transmit/receive beam pattern is often controllable using electromechanical beam steering elements, such as mechanical phase shifters. Beam steering is currently performed remotely by manipulation of electromechanical elements of an antenna array located at the top of the antenna mast. Electromechanical beam manipulation is limited to minor changes in tilt angle (typically up to 10°). Beam Steering in the horizontal azimuth plane, is implemented either manually or using electromechanical adjustments. Electromechanical phase shift beam manipulation (horizontal or vertical) does not extensively change the main beam shape. When performing beam steering, signals from conventional panel antennas elements are combined together prior to receive signal processing. However, with such vertical/horizontal azimuth plane beam steering it is known that angle of arrival information of incoming signals is not capable of being discerned.

Efficient use of energy and infrastructure resources is known to be a primary focus in the operational and capital expenditure in cellular networks. Furthermore, guaranteeing link performance improves QoE (Quality of Experience) to the user enabling ARPU (Average Revenue Per User) yielding services to be maximised. In order to enable Network Operators to optimise infrastructure configuration, information pertaining to the location of users within a sector, cell and cluster of cells would be useful. To date, Network Operators have conducted field trials concurrent with performing iterative updates to a most commonly used network configuration, as a means to network optimisation. This is known to be a slow and expensive process. Furthermore, such slow changes can not be dynamically adapted to user population changes within the network. Using conventional antenna systems, user geographic density can only be estimated for users as processed by a cell or cluster of cells. Sometimes triangulation methods can be attempted to determine where users exist within a cell or cluster of cells, based on handover information.

Receive (Rx) beam-forming using antenna arrays depends on the ability to constructively add incident signals on each of the antenna elements in a way that coherently adds those from the desired direction. Thus, incident signals that are not from the desired direction will be incoherently added, and thus will not experience the same processing gain. The term ‘coherency’ implies that the signals will have substantially the same phase angle when added in the beam forming process. In contrast, thermal noise from multiple sources exhibits incoherent properties. Thus, when thermal noise is added to the incident signals, the signals from multiple sources do not experience the same processing gain as a coherent desired signal.

Conversely, in transmit active antenna arrays, the signals are coherently combined in the ‘air’ within the intended beam pattern as electromagnetic (EM) signals. In this manner, they are arranged to arrive coherently at the intended mobile station (MS) (e.g. UE) receiver.

In order to address the limited flexibility associated with electromechanical phase shifter beam manipulation on an antenna array located at the top of the antenna mast, there has been recent interest in the use of smart or active antenna technology. This is a radio technology where the antenna system has dedicated signal processing per antenna array element or co-located antenna and signal processing units. The active antenna technologies fall into three broad families.

(i) multi-antenna systems (MAS);

(ii) radiohead with or without multiple in-multiple out (MIMO) signals; and (iii) radio-array.

It is known that active array antenna technology is able to facilitate independent and variable beam patterns in both uplink and downlink directions. Modern air interface protocols, such as WCDMA, allow multiple UEs to simultaneously transmit to the base-station on the uplink on a single carrier frequency. A minimal limit of signal to noise per bit (Eb/No) ratio is required on the uplink channel to ensure an adequate received signal bit error rate (BER). This implies that the higher the data rate for a particular wireless subscriber communication unit, otherwise referred to as user equipment (UE) at least a proportionally better Carrier to Interference plus Noise Ratio (CINR) is required to maintain Eb/No.

As the cell becomes more loaded, all UEs have to compensate by increasing their transmit power, so as to maintain Eb/No at the Node B receiver, since other UEs will add to the interference level. Likewise UEs requiring higher data rate services will require all UEs to compensate for higher Eb/No required of the Node B. This increase in transmit power by the UE can be detrimental to network performance. The increased power levels in the cell propagate to neighbouring cells forcing that cell to increase power levels to maintain Eb/No even though it may not be loaded heavily.

This effect poses a number of problems to WCDMA networks. For example, the noise floor of the communication cell is increased, which in turn causes a propagation effect on the network and reduces data transmission rates. Furthermore, UE devices consequently consume more power, as uplink transmissions are required to operate at higher power levels. In addition, limitations exist on maximum throughput per cell as a result of dynamic range limitations imposed on UE transmissions.

In a Node B antenna array, the received radio frequency (RF) signal from a single UE cannot be discerned without demodulation of the composite (constructively added) signal. Individual receive beam-forming for a specific user is not feasible, since there is likely to be multiple received signals of the same power from different UEs simultaneously at the antenna array. Even if only a few UEs are utilising the Node B at any point in time, the likelihood is that the signals received at the Node B would be below the noise floor of the Node B's receiver. As known, the processing gain of a WCDMA receiver implies that such signals can be extracted from the noise floor for further processing. This, however, still requires at least a partial demodulation process.

U.S. Pat. No. 5,889,494 describes a passive beamforming system for cellular communications, such as AMPS, in order to address the problem of re-use factor of channel frequencies within a cellular network. U.S. Pat. No. 5,889,494 utilises a 360° sector, and proposes a scanning apparatus that selects the antenna beams for processing. In U.S. Pat. No. 5,889,494 the scanning apparatus describes a selection device of fixed beams being processed and does not disclose any technique for dynamically changing a beam.

U.S. Pat. No. 7,072,692 describes a communication system that exploits spatial processing by incorporating a transmit beam pattern based on the incident uplink power angle of arrival in an associated time slot of the uplink channel. The method proposed in U.S. Pat. No. 7,072,692 estimates the uplink channel power by means of measuring the power per beam, with eight beams required per sector. This corresponds to a beam width generation of +/−7.5°. However, U.S. Pat. No. 7,072,692 fails to describe any realizable implementation of how to generate such narrow beams. Beamform generation of this accuracy would require a large array of antenna elements, which is not practical from a cost/power or size perspective with current wireless cellular systems.

SUMMARY OF THE INVENTION

Accordingly, the invention seeks to mitigate, alleviate or eliminate one or more of the above mentioned disadvantages singly or in any combination.

According to a first aspect of the invention, there is provided a wireless network element operably couplable to an antenna array for communicating with at least one remote wireless communication unit, wherein the antenna array comprises a plurality of radiating elements where at least one first radiating element of the plurality of radiating elements is arranged to create a radiation pattern in a sector of a communication cell. The wireless network element comprises: a receiver arranged to receive and process at least one signal from the at least one remote wireless communication unit via the at least one first radiating element and a beam scanning module for sweeping the radiation pattern through the sector of the communication cell, such that at least one signal from the at least one remote wireless communication unit is processed to identify signal parameters representative of incoming signal power and angle of arrival.

Thus, in one embodiment of the invention, the wireless network element employs a power scan method that enables the discernment of angular user density using an antenna array and beam-forming system. In this manner, it is possible to develop a spatial map of originating calls within a sector, thereby enabling a Network Operator to be able to determine areas of communication activity within the sector.

According to an optional feature of the invention, the beam scanning module is operably coupled to a database for recording values representative of incoming signal power and angle of arrival for a plurality of remote wireless communication units when sweeping the radiation pattern through the sector of the communication cell. In this manner, the obtained information is stored for later processing.

According to an optional feature of the invention, the beam scanning module is additionally arranged to identify a time parameter associated with the received at least one signal, which is also recorded in the database. In this manner, factors relating to time in the measurement process, for example with regard to high periods of communication activity within the cell, may be used to optimise the beam forming process.

According to an optional feature of the invention, the radiation pattern may comprise a measurement beam having a narrow beam. For example, according to an optional feature of the invention, the radiation pattern comprises two measurement beams: a first measurement beam forming a broad beam and a second measurement beam forming a corresponding broad beam with an additional notch, such that a narrow beam is formed by subtracting the second measurement beam from the first measurement beam. Thus, a narrow beam, however generated, may be swept (or stepped) through a sector, thereby providing more accurate user density information of UEs located within the cell.

According to an optional feature of this invention the wireless network element may further comprise dedicated signal processing per antenna array element. In this manner, the wireless network element is able to utilise a plurality of processed beams. As such, and advantageously, live network traffic need not be disrupted for the purpose of the scan. Furthermore, potential interference may be identified and spatially filtered prior to the demodulation process.

According to an optional feature of the invention, the beam scanning module may comprise a beam power calculation module arranged to calculate the incoming signal power by combining multiple angular diversity paths. Thus, more accurate signal measurements may be obtained in a manner that substantially eliminates for variations in angular rotation and consequently transmission polarity of a transmitting UE.

According to an optional feature of the invention, the antenna array comprises an active panel antenna unit, such that the receiver is arranged to receive and process the at least one signal from the at least one remote wireless communication unit via the at least one first radiating element of the active panel antenna unit. Thus, such an arrangement allows for an autonomous apparatus capable of performing power measurement, independent of operably coupling said at least one first radiating element to at least one first receiver unit.

Furthermore, in one optional embodiment, the wireless network element may comprise a controller module operably coupled to the beam scanning module and arranged to control at least one parameter associated with the operation of the beam scanning module with regard to at least one of the following: a scan profile of the antenna array, angular increment of a scan, a number of scan samples to be taken, a time of scan. Thus, control of the measurement process can be autonomously operated without excessive intervention of other network elements. Furthermore, such a controller allows for configuration of scan parameters enabling variation of measurement process' tailored to network element operating mode. Furthermore, the controller module may be arranged to step/sweep the radiation pattern through the sector of the communication cell during peak cell loading periods.

According to an optional feature of the invention, the wireless network element may further comprise a plurality of polarisation diversity receive processors arranged to utilise polarisation diversity when processing the at least one signal from the at least one remote wireless communication unit. Thus, the plurality of polarisation diversity receive processors allow for communication reception to be enhanced in a manner that substantially takes into account variations in angular rotation and consequently transmission polarity of a transmitting UE.

According to an optional feature of the invention, the beam scanning module may be arranged to average a plurality of the incoming signal power measurements thereby normalising the incoming power signal level to account for fading or modulation peaks or troughs. Thus, more accurate signal measurements may be obtained. These fluctuations in power are transitory, thereby they are capable of being averaged out to substantially minimise measurement accuracy impact.

According to an optional feature of the invention, the receiver may comprise an automatic gain control module and the beam scanning module may be arranged to additionally store automatic gain control information associated with receiving and processing the at least one signal. Thus, offsets in power measurements induced by automatic gain control can be used to obtain absolute values of power received, thereby improving the accuracy of measurements.

According to an optional feature of the invention, the beam scanning module may comprise a temperature monitoring module, such that the beam scanning module may be arranged to additionally store temperature information associated with receiving and processing the at least one signal. Thus, known temperature induced gain or noise effects on the respective receivers can be offset to improve accuracy of results across temperature operating ranges of the network element.

According to an optional feature of the invention, the beam scanning module may be operably coupled to a mean power squared module, such that the beam scanning module is arranged to store squared power information associated with the at least one signal. The beam scanning module may be further arranged to measure a power level from separate receive diversity paths and store squared power information associated with each processed beam as separate entries in the database. Thus, computational processing overhead of the beam scanning module is advantageously reduced.

According to an optional feature of the invention, the wireless network element may further comprise a call logging module arranged to record information associated with calls in the communication cell, and an interference identification module arranged to identify interference sources by comparing call information with the signal parameters representative of incoming signal power and angle of arrival. Thus, corrective actions, determined by such comparisons, can be applied to the configuration of the network elements, thereby improving operating performance of the network.

According to an optional feature of the invention, the receiver and beam scanning module may be arranged to perform satellite tracking of an orbiting satellite. In one optional embodiment, the receiver and beam scanning module are arranged to operate such that they do not disrupt live traffic processing of the network element. Thus, UE communication link performance is not impaired, or intermittently ceased, for the purposes of scan.

According to a second aspect of the invention, there is provided a method for beam scanning using an antenna array in a wireless cellular communication system that comprises a network element operably coupled to the antenna array for communicating with a remote wireless communication unit. The method comprises configuring at least one first radiating element of a plurality of radiating elements in the antenna array to create a radiation pattern in a sector of a communication cell; and receiving at least one signal from at least one remote wireless communication unit via the at least one first radiating element; and processing the at least one signal from the at least one remote wireless communication unit via the at least one first radiating element. The method further comprises sweeping the radiation pattern through the sector of the communication cell; and identifying from the at least one signal the signal parameters representative of: incoming signal power and angle of arrival of the received at least one signal.

According to a third aspect of the invention, there is provided a wireless communication system adapted to support the operation of the wireless network element according to the first aspect of the invention.

According to a fourth aspect of the invention, there is provided a computer program product comprising program code for beam scanning using an antenna array in a wireless cellular communication system that comprises a network element operably coupled to the antenna array for communicating with a remote wireless communication unit. The computer program product comprising program code operable for configuring at least one first radiating element of a plurality of radiating elements in the antenna array to create a radiation pattern in a sector of a communication cell; receiving at least one signal from at least one remote wireless communication unit via the at least one first radiating element; and processing the at least one signal from the at least one remote wireless communication unit via the at least one first radiating element. The program code is also operable for stepping the radiation pattern through the sector of the communication cell; and identifying, from the at least one signal, signal parameters representative of incoming signal power and angle of arrival of the received at least one signal.

According to a fourth aspect of the invention, there is provided a network element for use in a cellular communication system. The network element comprises a receiver for receiving signal parameters representative of incoming signal power and angle of arrival, following a beam scanning module of a wireless network element sweeping a radiation pattern through a sector of a communication cell; a signal processor arranged to determine at least one antenna parameter from the received signal parameters; and means for communicating at least one modified antenna parameter to at least one radiating element of a plurality of radiating elements formed in an antenna array operably coupled to the wireless network element to create a radiation pattern in a sector of a communication cell in response to the received signal parameters.

According to an optional feature of the invention, the network element may be one of: an Operations and Management Centre (OMC), a Node B, a radio network controller (RNC).

According to a fifth aspect of the invention, there is provided a method for adapting at least one radiating element of a plurality of radiating elements formed in an antenna array. The method comprises receiving signal parameters representative of incoming signal power and angle of arrival, following a beam scanning process of a wireless network element sweeping a radiation pattern through a sector of a communication cell; processing the received signal parameters to determine at least one antenna parameter; and communicating at least one modified antenna parameter to the at least one radiating element of the plurality of radiating elements formed in an antenna array operably coupled to the wireless network element to create a radiation pattern in a sector of a communication cell in response thereto.

These and other aspects, features and advantages of the invention will be apparent from, and elucidated with reference to, the embodiments described hereinafter.

Figure 1:
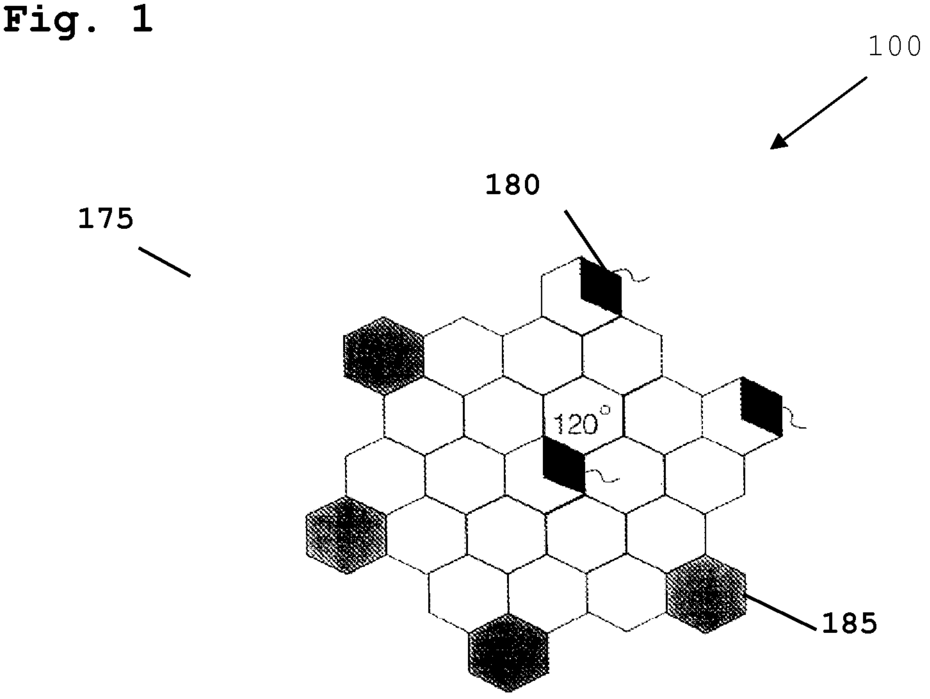
FIG. 1 illustrates a known wireless cell-plan architecture using 120° sectors.
Figure 2:
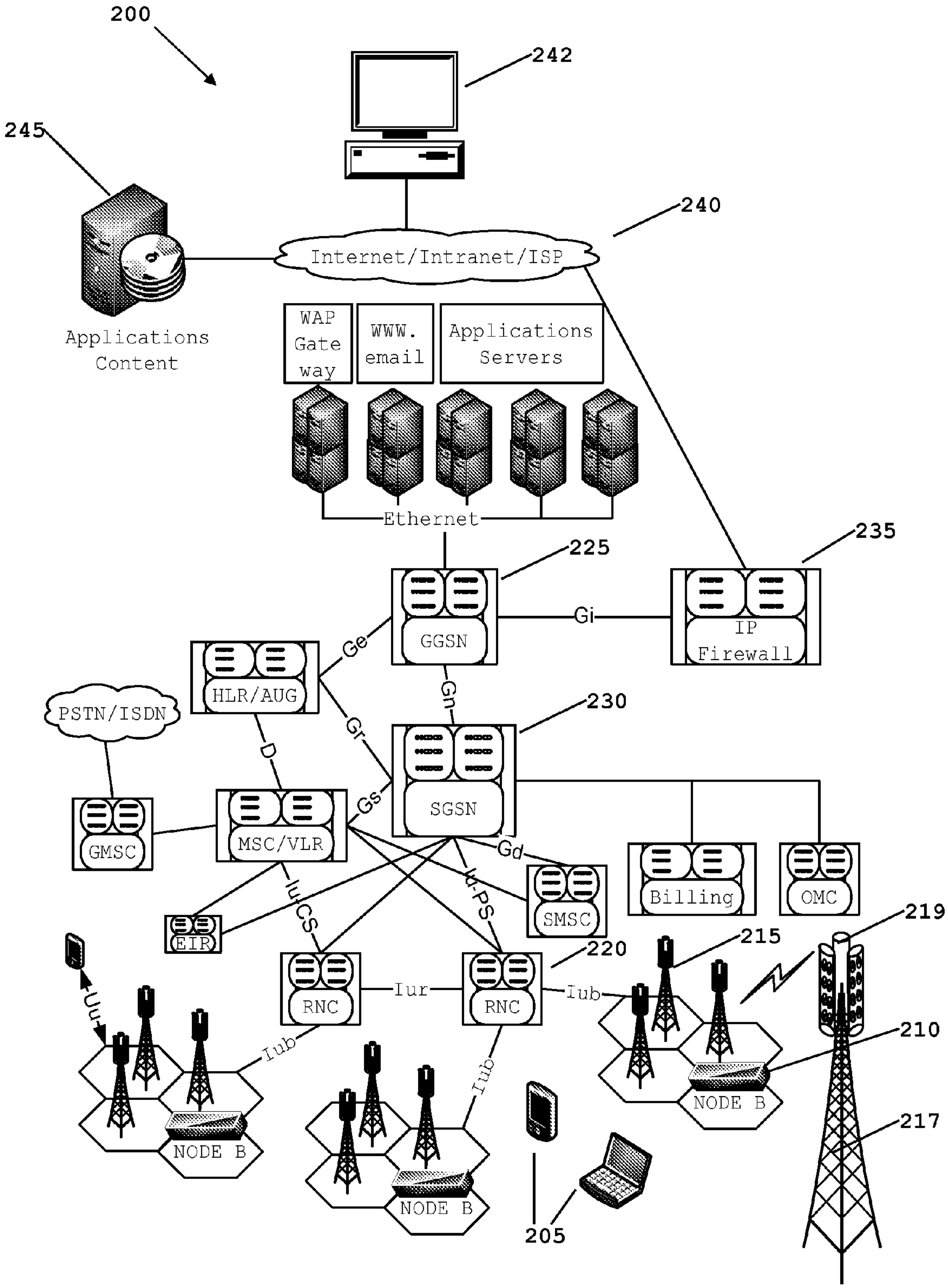

Embodiments of the invention will be described, by way of example only, with reference to the accompanying drawings, in which:

FIG. 2 illustrates an example of a $3^{rd}$ generation (3G) wireless communication system architecture adapted in accordance with some embodiments of the invention.

Figure 3:
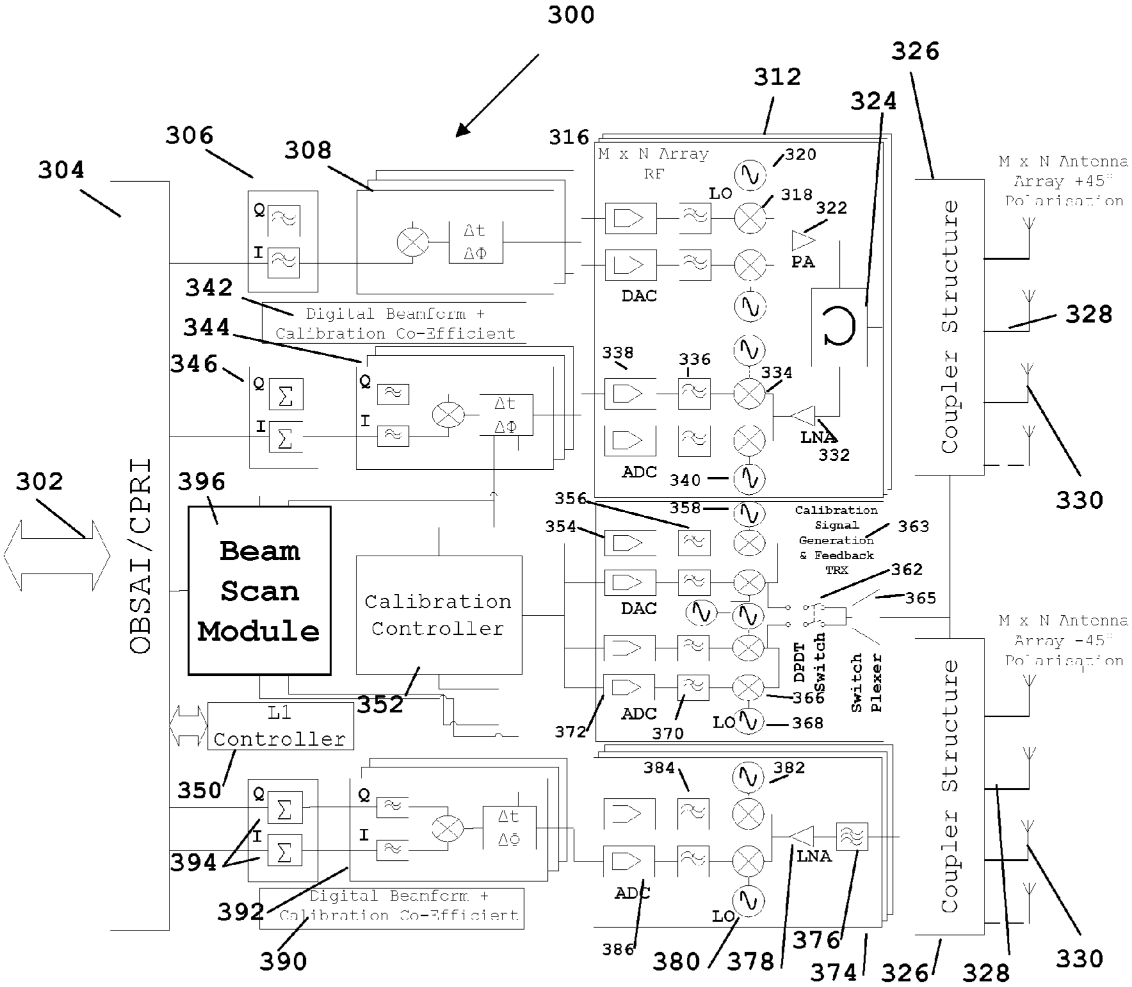

FIG. 3 illustrates an example of an adaptive antenna array architecture adapted in accordance with some embodiments of the invention.

Figure 4:
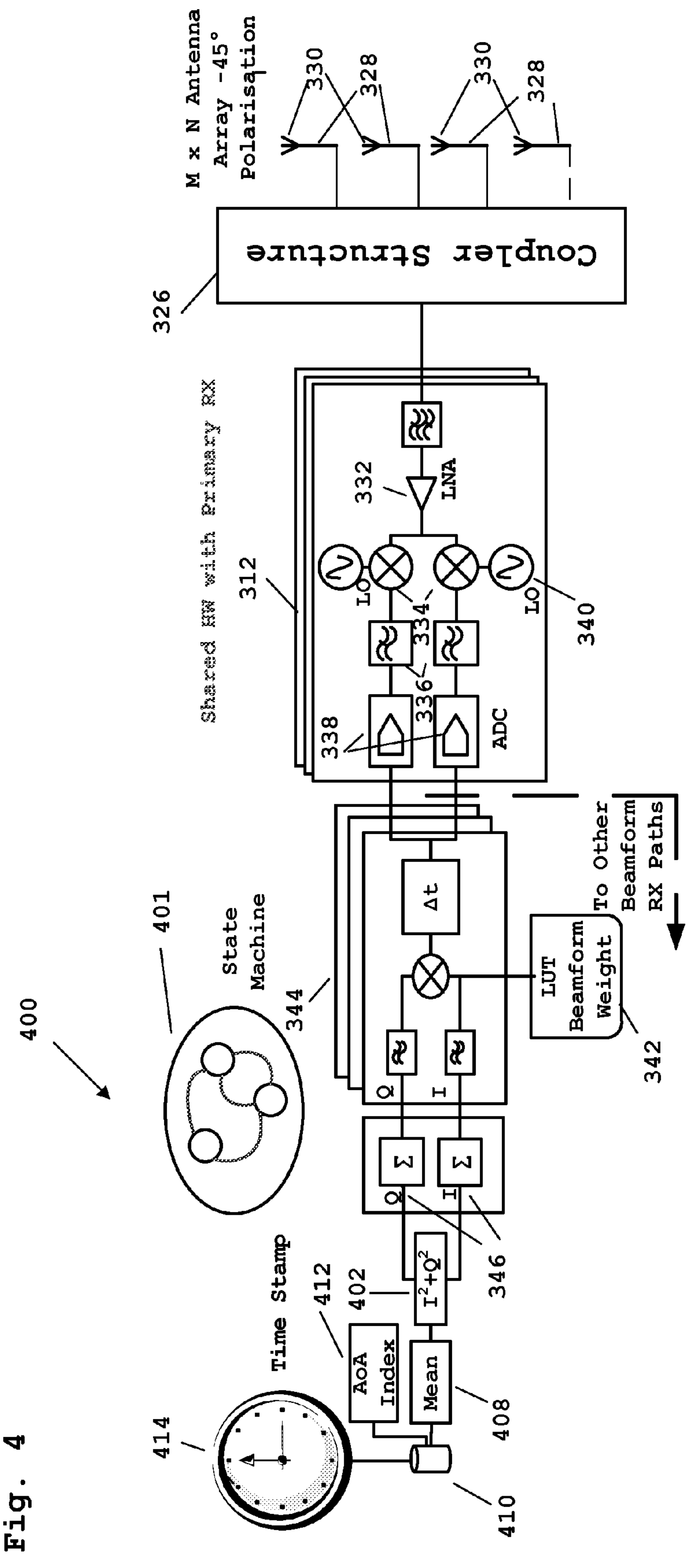

FIG. 4 illustrates an example of a network element adapted to perform beamforming signal processing in accordance with some embodiments of the invention.

Figure 5:
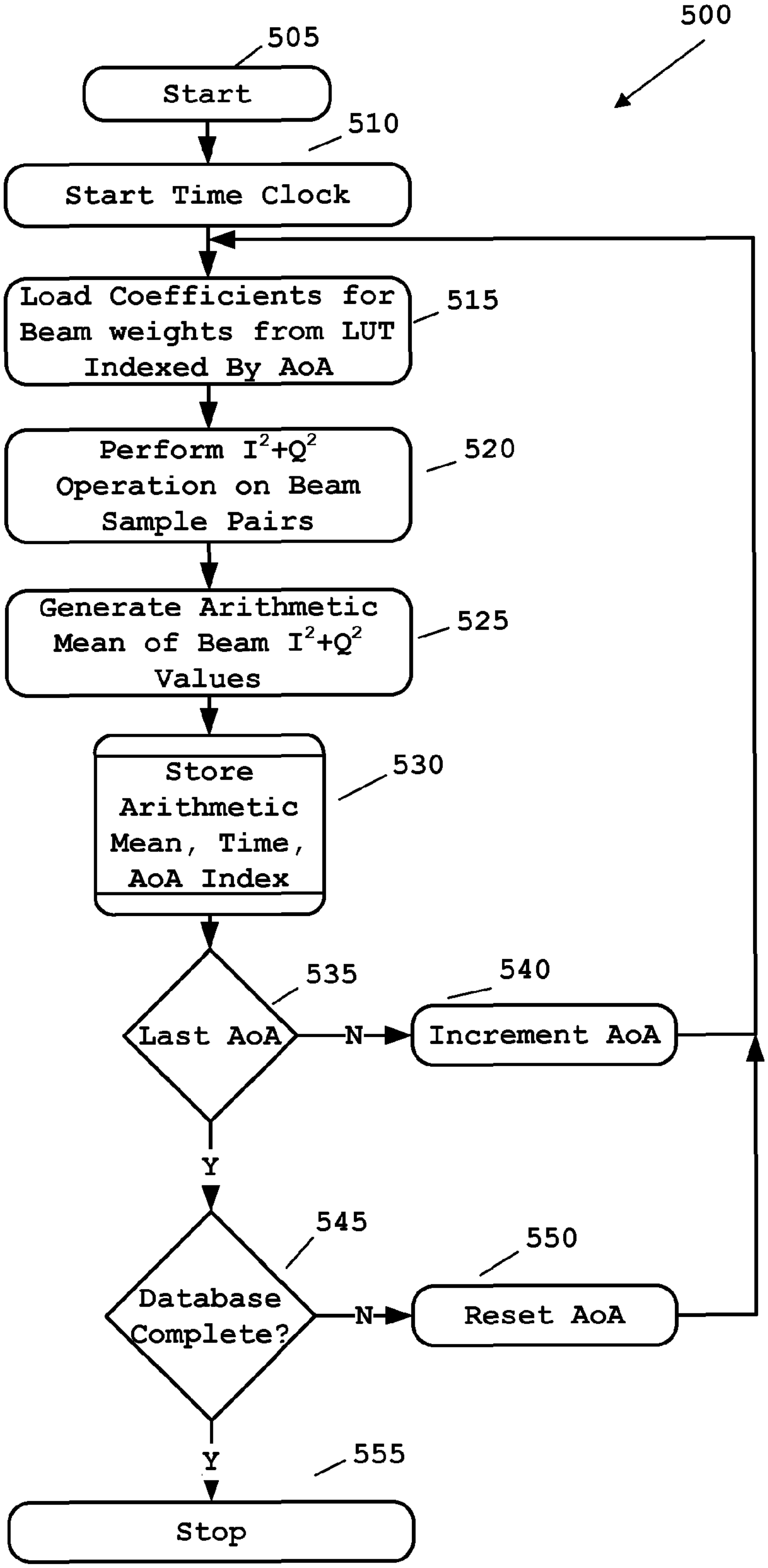

FIG. 5 illustrates an example of a flowchart for processing the beamforming signals of FIG. 4 in accordance with some embodiments of the invention.

Figure 6:
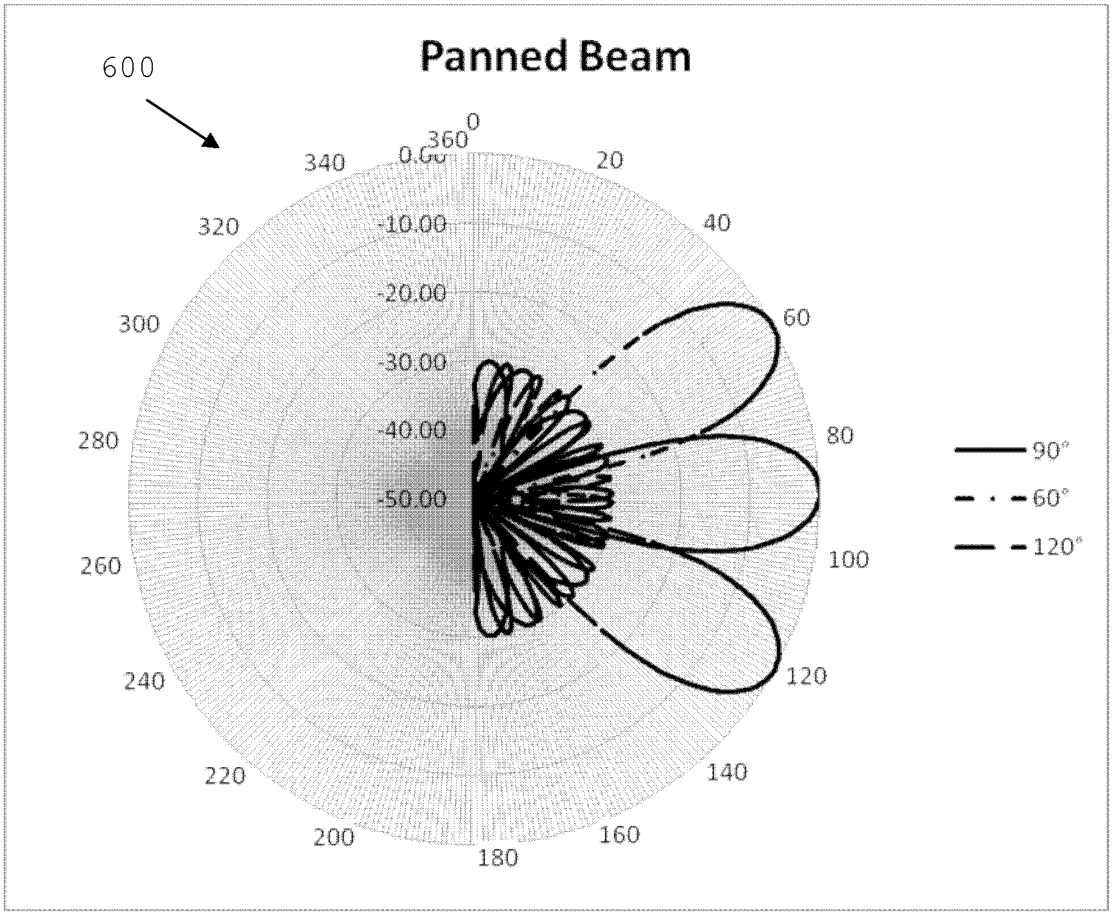

FIG. 6 illustrates azimuth patterns of beam formation indexing through a spatial scan in accordance with some embodiments of the invention.

Figure 7:
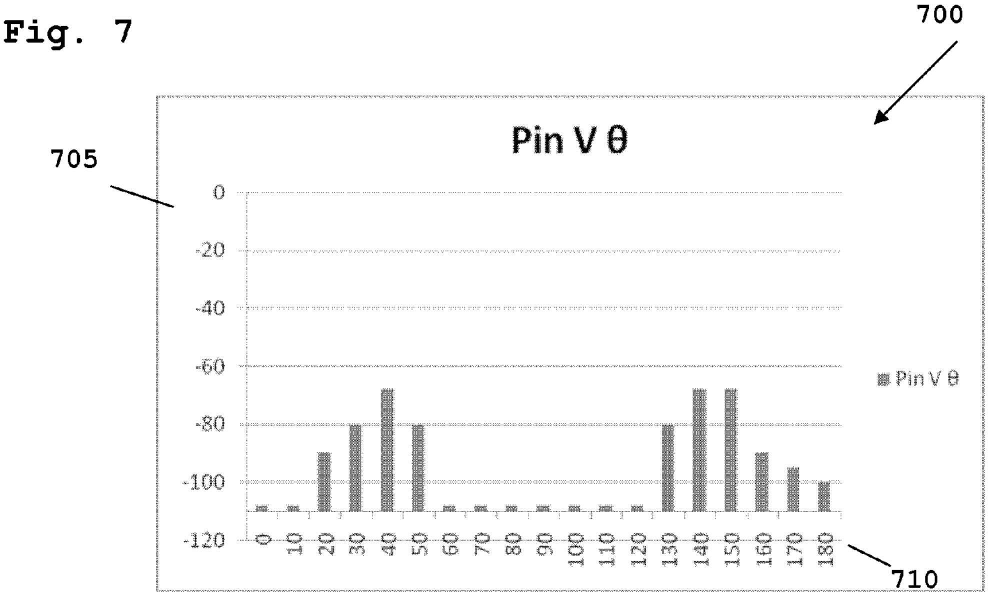

FIG. 7 illustrates a graphical example of an output of the example flowchart of FIG. 5 in performing the spatial scan illustrated in FIG. 6 in accordance with embodiments of the invention.

Figure 8:
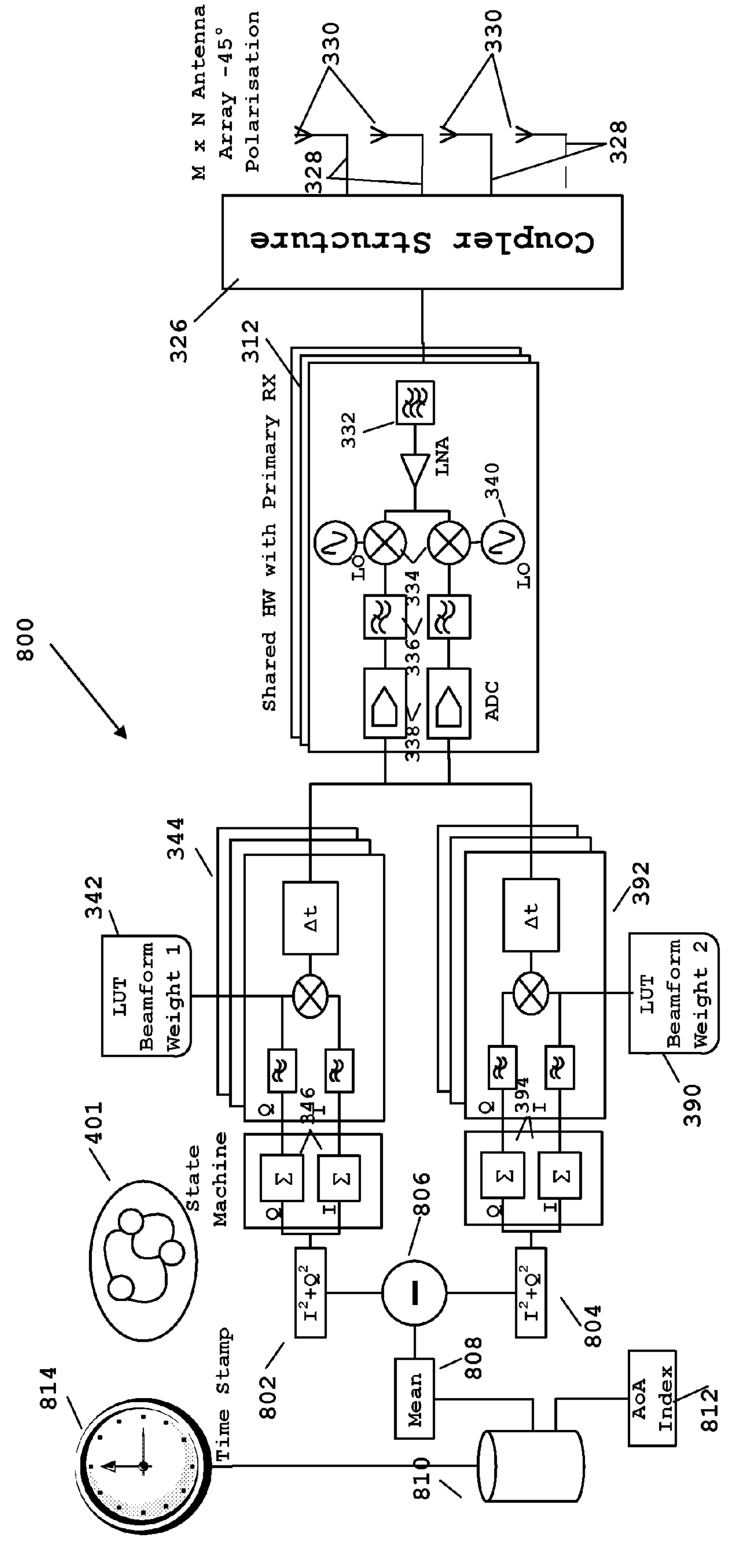

FIG. 8 illustrates an example of a network element adapted to perform beamforming signal processing in accordance with some alternative embodiments of the invention.

Figure 9:
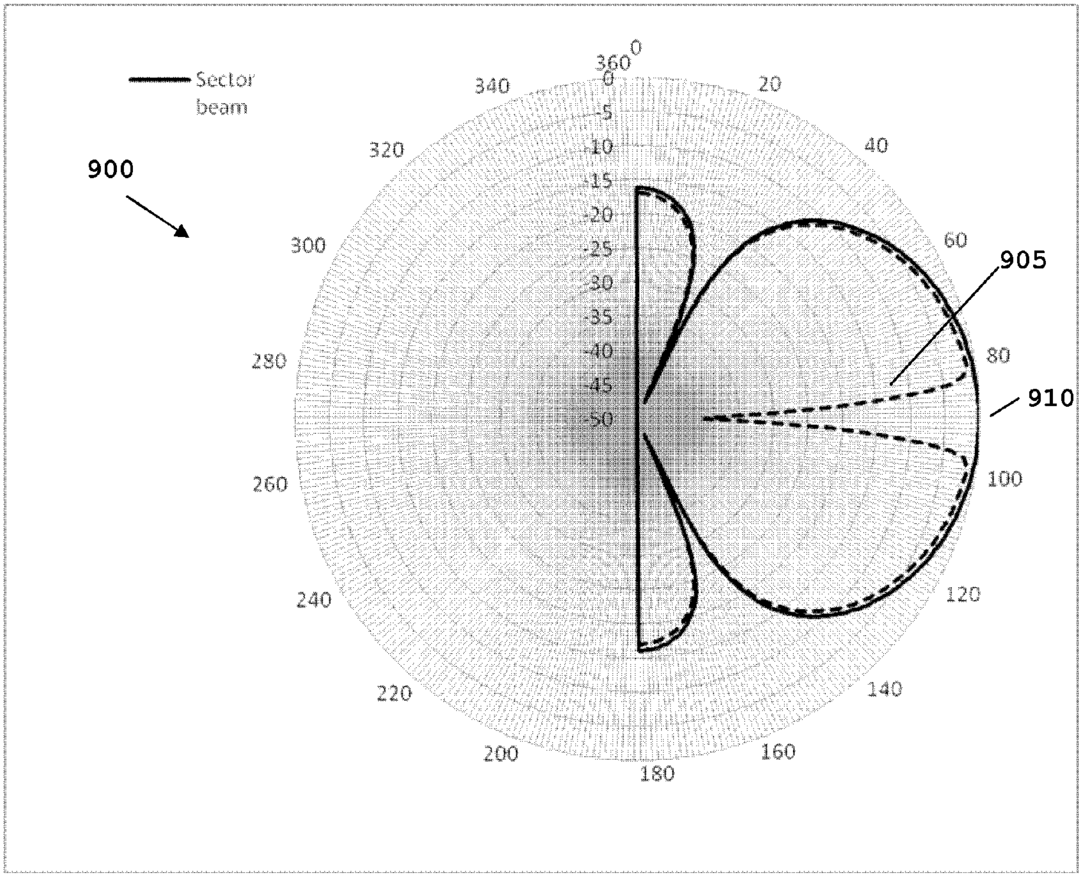
Figure 10:
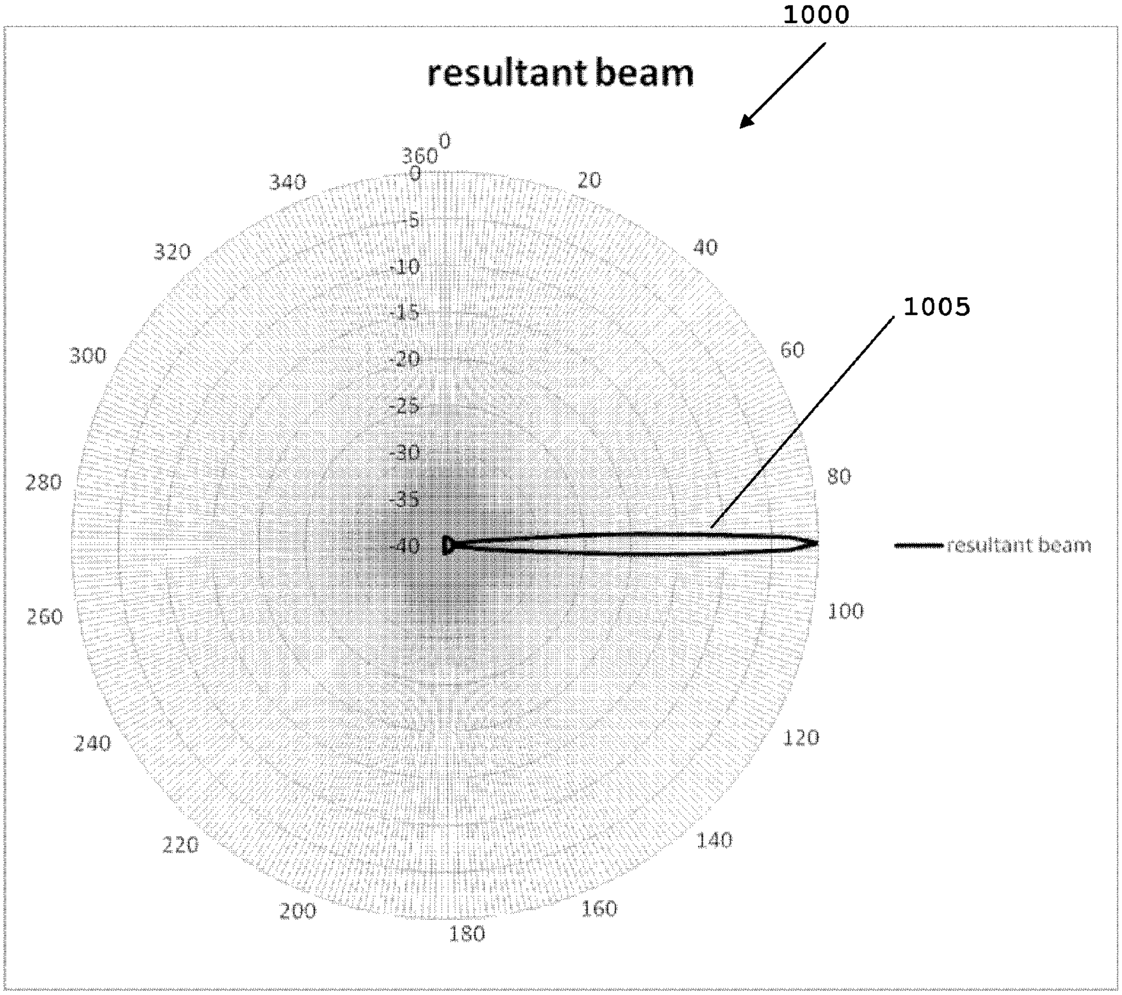
Figure 11:
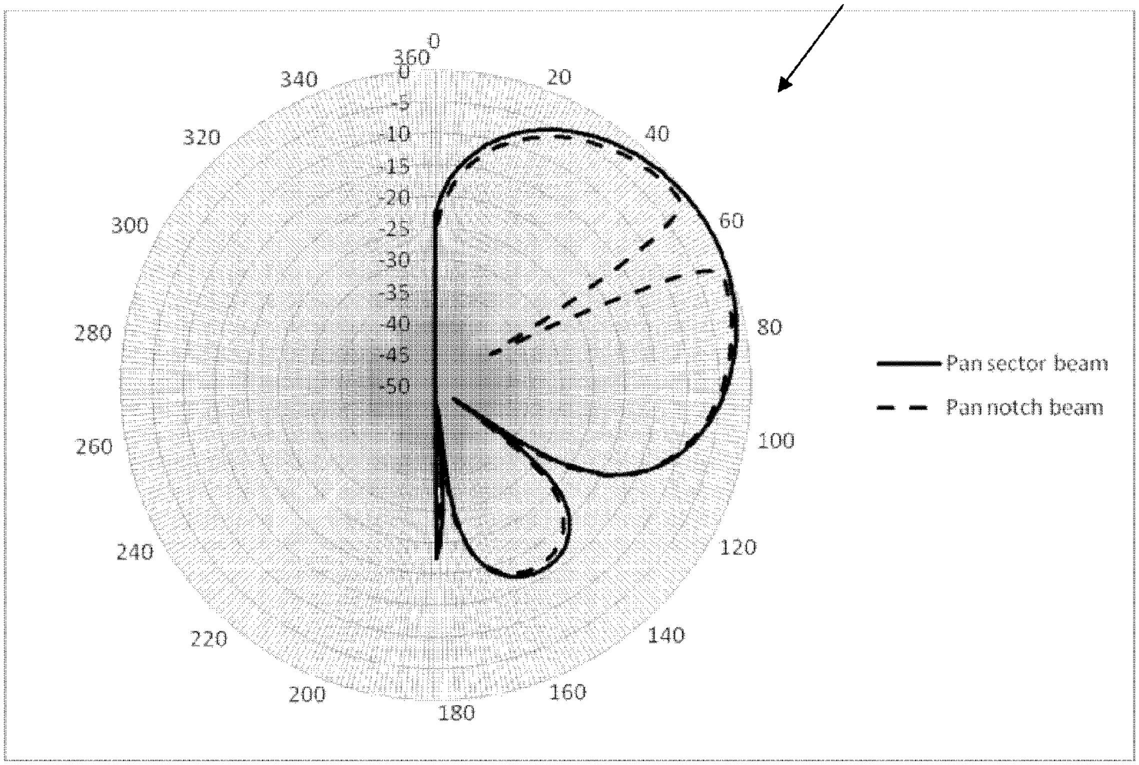

FIG. 9, FIG. 10 and FIG. 11 illustrate examples of azimuth patterns of beam formation for indexing through a spatial scan in accordance with some alternative embodiments of the invention.

Figure 12:
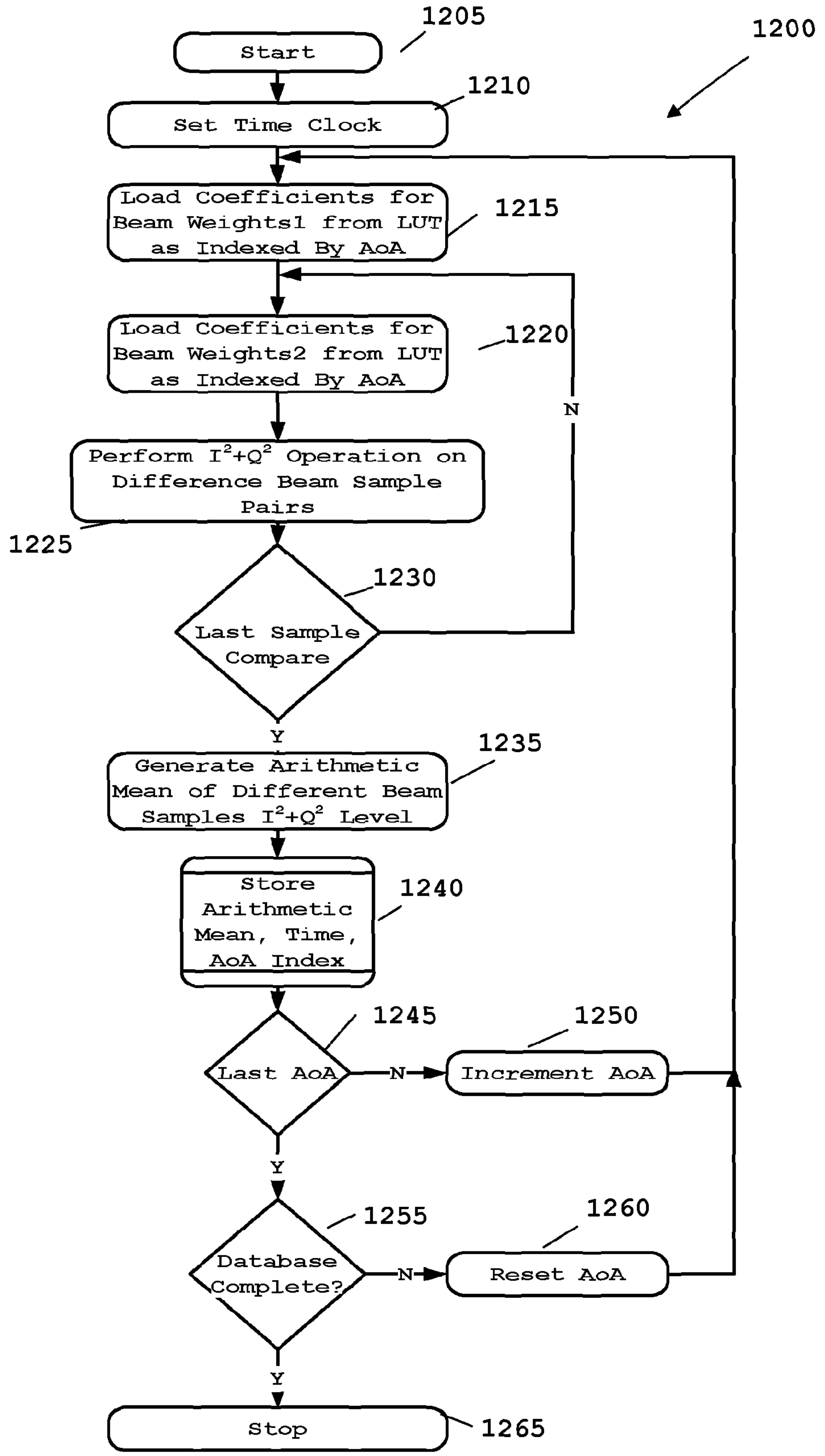

FIG. 12 illustrates an example of a flowchart for processing the beamforming signals of FIG. 8 in accordance with some alternative embodiments of the invention.

Figure 13:
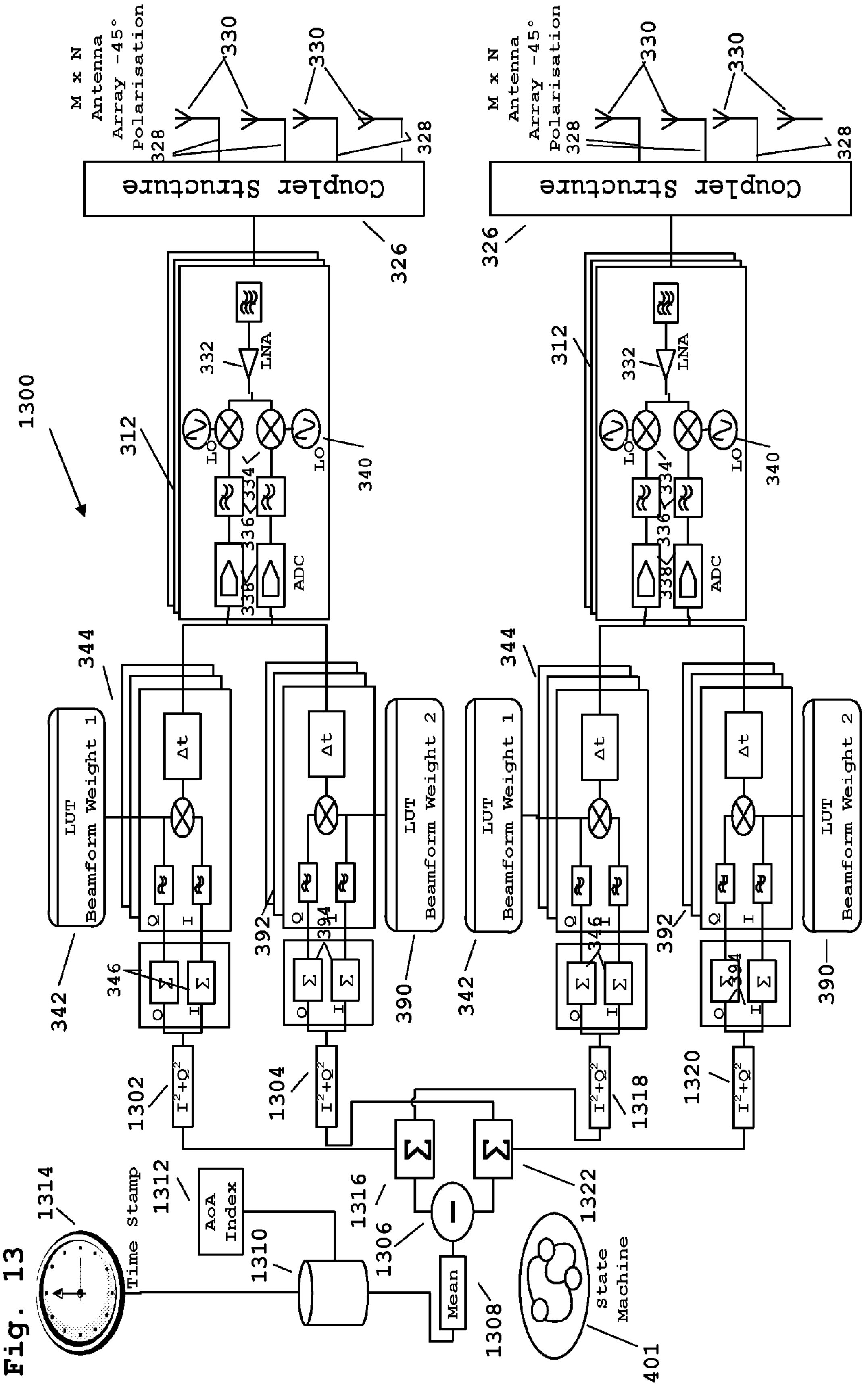

FIG. 13 illustrates an example of a network element adapted to perform beamforming signal processing in accordance with further alternative embodiments of the invention.

Figure 14:
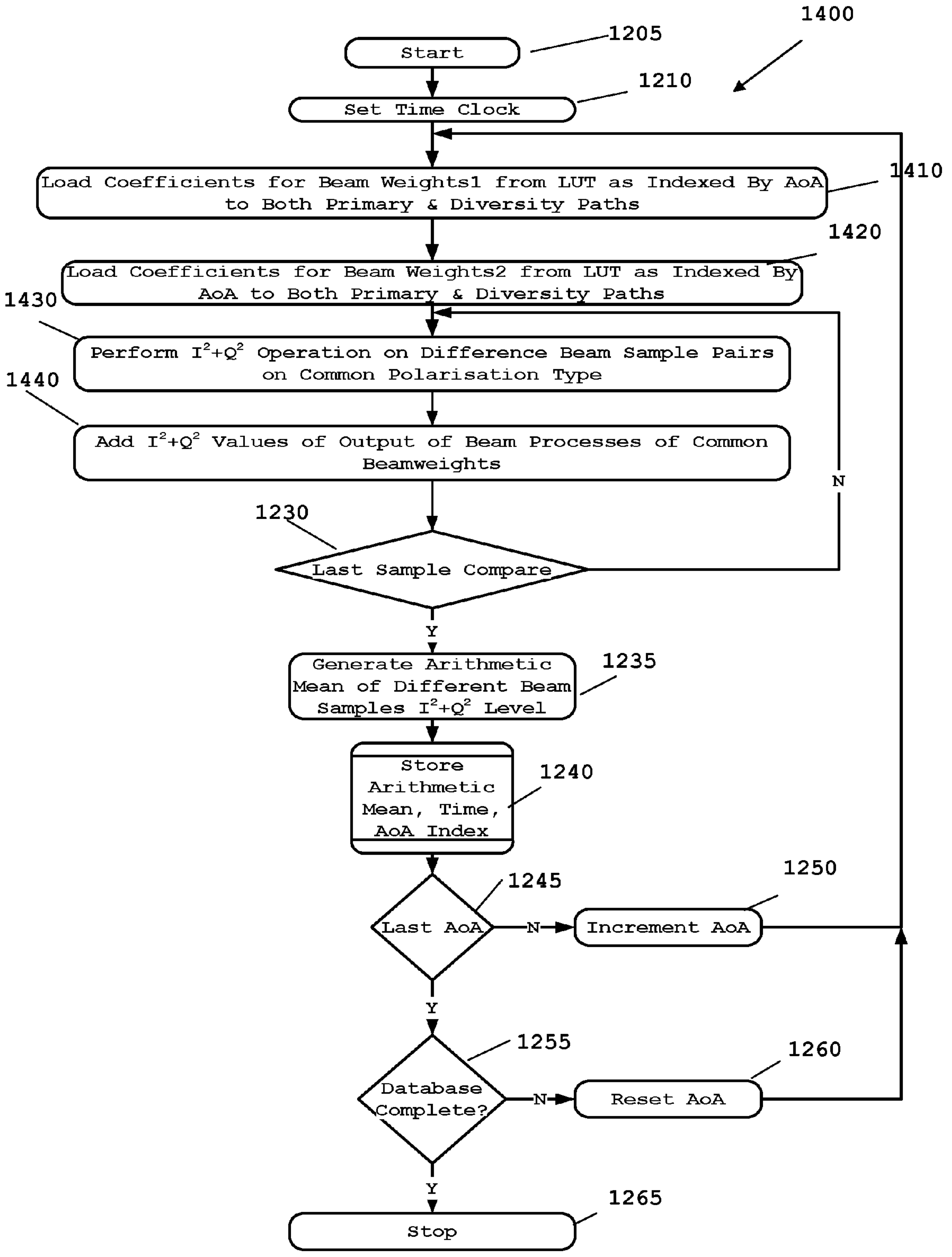

FIG. 14 illustrates an example of a flowchart for processing the beamforming signals of FIG. 13 in accordance with some alternative embodiments of the invention.

Figure 15:
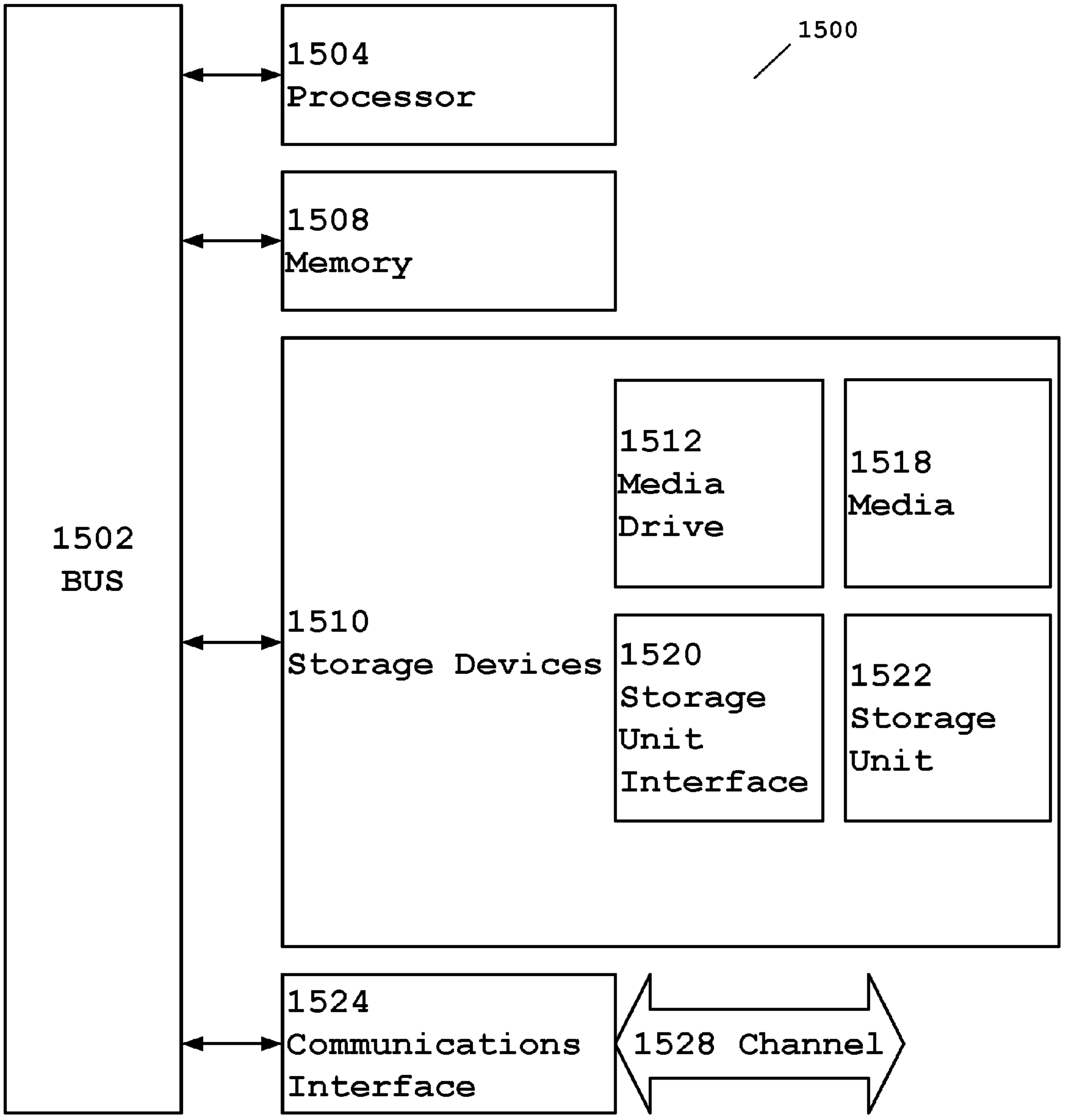

FIG. 15 illustrates a typical computing system that may be employed to implement signal processing functionality in embodiments of the invention.

DETAILED DESCRIPTION

Many air interface standards exploit multiple access techniques using a common uplink or downlink carrier frequency. These include wideband code division multiple access (WCDMA) and orthogonal frequency division multiplexing (OFDM) based air interface protocols. As a result, multiple users may access the same Node B base station simultaneously. In existing systems, discerning angular user density using an antenna array and beam-forming system is not practical since a full demodulation process would be required for multiple narrow spatial beams. Furthermore, a demodulation only process would not help in the detection of interference sources within the sector. Embodiments of the invention employ a power scan method, where potential interference may be identified and spatially filtered prior to the demodulation process.

In contrast to known antenna array and beam-forming architectures, where only one beam (transmit or receive) is processed, embodiments of the invention utilise a plurality of processed beams. As such, and advantageously, live network traffic need not be disrupted for the purpose of the scan. In the context of embodiments of the invention, the term ‘beam’ is meant to encompass a profile of antenna radiation pattern contoured in both elevation and horizontal azimuth angular planes of equal EM radiation signal strength. Embodiments of the invention exploit the scenario that a number of UE devices’ transmitting paths to a Node B are generally angularly dispersed within a sector supported by an antenna array beam-form. In particular, embodiments of the invention employ active array antenna technology utilising multiple receive beam-forming paths.

In the examples herein described, an antenna array element is a radiative structure whose purpose is to convert electro-magnetic (EM) signals to electrical signals, or vice versa, in which a singular element has a fixed radiation pattern. The term 'radiative elements' described herein refers to elements capable of radiating an electromagnetic signal. Furthermore, the term 'radiative elements' described herein also encompasses structures capable of absorbing EM radiation and converting to electrical signals. These elements, constructed as an array can be configured to have various radiation patterns by manipulation of electrical signals coupled to the elements. Thus, the ability to alter the radiative beam shape may be achieved.

For completeness, it is worth clarifying the Antenna Reciprocity Theorem, which in classical treatises on electromagnetic fields and antennas is usually formulated as follows:

Given two antennas 'A' and 'B' placed at some distance apart, each of them may be operated either as a transmitting antenna or as a receiving antenna. Suppose that antenna 'B' is kept intact, whilst the performance of antenna 'A' as a transmitter is modified. A consequence of this is that, for a fixed amount of input power, the signal received by antenna 'B' changes by a factor 'F' due to the change imposed on antenna 'A'. Then the same modification changes also the performance of antenna 'A' as a receiver and does so by the same factor 'F'. The theorem follows from certain symmetries of Maxwell equations and its validity is easily verified experimentally and has been widely published. Hence, the radiation pattern induced by a transmitter with same beam-form weights and same carrier frequency as a receiver has identical azimuthal angular link loss. Thus, the term 'radiative beam pattern' can also be applied to a receiver.

In one example of the invention, Active Panel Antennas are used that facilitate mutually independent and variable beam patterns in both (transmit and receive) directions. Furthermore, multiple instantiations of receive beams can be generated from the received data signals. As a consequence of being able to generate multiple beam formations in a receive mode, embodiments of the invention describe a method and apparatus capable of beam scanning a sector of a communication cell and compiling scanned information. In this manner, it is possible to develop a spatial map of originating calls within a sector, thereby enabling a Network Operator to be able to determine areas of communication activity within the sector.

In accordance with embodiments of the invention, the signal from each receiver can be operably coupled to a plurality of beam former modules, thereby allowing multiple received radiative patterns to be processed. In the field of radio-array active antenna technology, receive signals are additively combined coherently from the different receiver (Rx) elements. This receive combining may be implemented in the digital domain. For optimal coherency to exist on the separate signals at the combining stage, the latency, phase response and/or gain response of the respective receive paths typically needs to be equalised. Different receivers in an antenna array may exhibit variations in these characteristics due to, say, component manufacturing tolerances, clock skew, temperature and power supply variations, etc. For example, in practical systems, there will be different instantiations of voltage regulators, and therefore the different devices exhibit process induced offsets and temperature-dependent coefficients. Similarly, the clock distribution to multiple transceivers undergoes variations in the clock path, thereby causing an offset in relative phase to each transceiver. It is also known that temperature profiles within the antenna array housing may be significant.

Furthermore, each of the transceivers will not have the same proximity to heat generating components, such as the digital signal processing chain. Likewise certain transceivers will be at a periphery of the antenna array, and therefore experience more variation due to the ambient environment. In addition, some transceivers will have different transmit power profiles, according to the beam-form coefficients, and as a result exhibit different thermal generation profiles.

A limiting factor in determining angle of arrival of signals is the ability to generate a beam of sufficient angular resolution. In known cellular antenna array units, horizontal azimuth half power beam width (HPBW) is generally fixed at +/−)65° (130° for a 3-sector cellular infrastructure. A beam width of this magnitude allows limited panning ability on a 180° plane. Furthermore, since the HPBW is so broad, it is not possible to determine the angle of arrival (AoA) resolution of incoming signals with sufficient resolution to be of significant use. Furthermore, the ability to generate beams of significantly narrow beam width is limited to the amount of elements in the antenna matrix array, and more specifically the number of columns used in the antenna array. As an example, a common cellular antenna array would contain sixteen elements made up of two columns and eight rows. The eight rows can typically form a vertical azimuth HPBW of 10°. Significantly increasing the size of an array to add more columns is not practical as the size of the antenna array device would increase.

Beam formations are often described in terms of horizontal and vertical azimuth. Hence, two, two-dimensional diagrams can be used to illustrate the three dimensional aspects of the beam. Examples of the inventions described herein are described in terms of one azimuthal plane for the purpose of Angle of Arrival power measurements, namely horizontal. However, it is envisaged that all embodiments could be equally applied to measurements of Angle of Arrival power measurements in the vertical azimuth plane in addition or in the alternative to the horizontal azimuth plane.

In one example of the invention, a spatial scan of a sector is formed by panning a narrow beam about the 180° plane of a main sector beam. Thus, a user spatial profile is determined by beam scanning a sector and the resultant information recorded as angular power density versus time. In the description of the invention, the terms 'sweep', 'scan' and step' may be used interchangeably to encompass the beam pattern moving through the sector, for example in a scanning mode of operation that may employ a 'sweep' or 'step' movement. Such beam scanning provides a log of activity in a particular sector that further allows cell optimisation operations to improve load balancing of the cellular network with regard to neighbouring sectors. In one example, this information is also exploited in determining how best to configure coverage within the cell, for example radio frequency (RF) coverage may be enhanced in a spatial location directed towards the highest density of callers, for example at a particular time of the day, rather than support saturation coverage of the entire cell sector. Furthermore, a log of activity as a function of time allows a network to be responsive to providing coverage based on statistically relevant activity patterns within cells. Advantageously, in one example, existing antenna elements and analogue/RF receiver circuits in an antenna array and beam-forming system may be re-used together with embodiments of the invention hereinafter described.

It is known that cellular network infrastructures are developed to cope with peak load conditions, noting that this condition happens infrequently. Examples of the invention enable a cellular network to dynamically change the network configuration. This improves the power efficiency and capital infrastructure expenditure of a network. Furthermore, a more efficient use of existing sites is possible, as load balancing of 'hotspots' on the network can now be achieved.

Referring now to FIG. 2, a cellular-based communication system 200 is shown in outline, in accordance with one example embodiment of the invention. In this example, the cellular-based communication system 200 is compliant with, and contains network elements capable of operating over, an universal mobile telecommunication system (UMTS) air-interface. In particular, the embodiment relates to the Third Generation Partnership Project (3GPP) specification for wide-band code-division multiple access (WCDMA) standard relating to the UTRAN radio Interface (described in the 3GPP TS 25.xxx series of specifications).

A plurality of wireless subscriber communication units/terminals (or user equipment (UE) in UMTS nomenclature) 205 communicate over radio links with a plurality of base transceiver stations, referred to under UMTS terminology as Node-Bs, 215 supporting communication coverage over a particular communication cell 210. The system 200 comprises many other UEs and Node-Bs, which for clarity purposes are not shown.

The wireless communication system, sometimes referred to as a Network Operator's Network Domain, is connected to an external network 240, for example the Internet. The Network Operator's Network Domain includes:

(i) A core network, namely at least one Gateway General Packet Radio System (GPRS) Support Node (GGSN) 225 and at least one Serving GPRS Support Nodes (SGSN) 230; and (ii) An access network, comprising a UMTS Radio network controller (RNC) 220; and at least one UMTS Node-B 215, where each RNC 220 may control one or more Node-Bs 215.

The GGSN 225 or SGSN 230 is responsible for UMTS interfacing with a Public network, for example a Public Switched Data Network (PSDN) (such as the Internet) 240 or a Public Switched Telephone Network (PSTN). The SGSN 230 performs a routing and tunnelling function for traffic, whilst a GGSN 225 links to external packet networks. Each SGSN 230 provides a gateway to the external network 240. The Operations and Management Centre (OMC) is operably connected to RNCs 220 and Node-Bs 215. The OMC comprises processing functions and module functionality in order to administer and manage sections of the cellular communication system 200, as is understood by those skilled in the art.

The Node-Bs 215 are connected to external networks, through Radio Network Controller (RNC) stations, including RNC 220 and mobile switching centres (MSCs), such as SGSN 230. A cellular communication system will typically have a large number of such infrastructure elements where, for clarity purposes, only a limited number are shown in FIG. 2.

Each Node-B 215 contains one or more transceiver units and communicates with the rest of the cell-based system infrastructure via an $I_{ub}$ interface, as defined in the UMTS specification. Each Node B 215 is operably coupled to an antenna mast 217, via a network element (not shown) that may be located on the antenna mast 217 for transmitting and receiving signals to/from remote UEs, where each antenna mast 217 comprises the network element and antenna array 219 adapted in accordance with embodiments of the invention.

In examples of the invention, incoming RF signals that are incident on the antenna array have an Angle of Arrival (AoA) calculated. These AoA calculations are made by a controller module (as described later) in conjunction with the active beam-former modules in the network element, and are relayed back to the Node-B 215 or OMC.

In one example embodiment, it is envisaged that system-wide enhancements may be achieved. For example, in embodiments of the invention, a number of Node Bs 215 are arranged in a cluster to 'locally' monitor information relating to the cell environment, using the adapted network element/antenna array arrangement, and this information is passed to the system's OMC.

In order to assist network optimisation, it is known that there may be statistically more signals coming from a narrower angle of arrival on an antenna array. This information may be statistically processed from the signal received on the individual antenna elements. In one example, it is envisaged that this information is relayed back to the OMC using, for example via IP messages sent by the network element described in say, FIG. 3. In response to these IP messages, the OMC may be able to adjust network parameters, such as beam direction and beam-form Azimuth pattern type. Alternatively, or additionally, the OMC may use such information to change uplink or down link pattern types, for example to better optimise or plan the network.

Thus, a network element, such as an Operations and Management Centre (OMC), a Node B, a radio network controller (RNC), may be used in a cellular communication system to effect a method for adapting at least one radiating element of a plurality of radiating elements formed in an antenna array. The network element, such as the OMC comprises a receiver for receiving signal parameters representative of incoming signal power and angle of arrival, following a beam scanning module of a wireless network element sweeping a radiation pattern through a sector of a communication cell; a signal processor arranged to determine at least one antenna parameter from the received signal parameters and means for communicating at least one modified antenna parameter to at least one radiating element of a plurality of radiating elements formed in an antenna array operably coupled to the wireless network element to create a radiation pattern in a sector of a communication cell in response to the received signal parameters.

Referring now to FIG. 3, an example of a network element 300 comprising a plurality of transceiver arrays 312 and associated conversion circuitry allowing Node-B processing and beam-forming is illustrated in accordance with embodiments of the invention. One example of the invention utilises an OBSAI RP3 01 or CPRI interface 302, which is used for interfacing to the baseband processing unit of, say, a cellular base station, such as a 3GPP Node B. The Node B base band performs demodulation and modulation encoding. The Node B also interfaces with the RNC to supply back haul communication to the rest of the network and wider communication infrastructure, as described with reference to FIG. 2.

The example illustrated in FIG. 3 also details an implementation using diversity reception. Modern air-interface protocols exploit antenna diversity to improve the air interface communication link. Antenna arrays often contain an array of radiative antenna elements of +45° and −45° polarisation. An '8'×'2' element antenna array consists of sixteen antenna elements at +45 degree polarisation and sixteen antenna elements at −45 degree polarisation. Therefore, thirty-three receivers would typically be required (with one extra for calibration needs). Prior to the demodulation process, signals received on a common polarization type antenna element are processed together. Since these are diverse paths, coherency is unlikely to exist and, therefore, the signals are not combined in the radio frequency (RF) domain or prior to demodulation processing. Generally, it is sufficient to transmit in one polarisation type only. Hence, in one example, transceiver circuits are connected to antenna elements of one polarisation type only. Conversely, receive diversity paths 374 are processed independently. In one embodiment, cross-polarised antenna arrays may be used. In this embodiment, a separate diversity receive path is required for each antenna element for both diversity and primary receivers.

The receiver elements of the active antenna array 330 are arranged to individually provide down-converted digitised samples corresponding to the receive channel in question for the received signals. As will be appreciated by a skilled artisan, the transmit section is also operably connected to the antenna array 330.

The OBSAI RP3 01 or CPRI interface 302, as decoded from the Node B baseband, outputs IQ sample pairs and the digital signal processing chain for the active antenna performs filter functions 306 and application of beam-form weights 308 for each of the individual transceiver elements. In accordance with embodiments of the invention, beam-form weights 308 may comprise of relative phase, amplitude and/or latency relationship to each of the antenna elements. Calibration correction resultant coefficients (in order to eliminate calibration measurement errors) are applied to the composite beam-form error correction process.

Each of the plurality of parallel transceiver circuits 312 comprise digital to analogue conversion, 314, to generate complex baseband analogue signals. The analogue signals are filtered, 316, and frequency translated, 318, 320, to the desired RF band. These RF signals are amplified, 322, and routed through a duplexer device, 324, in order to isolate transmit signals from the receive paths. Once amplified, the RF signals are routed to the antenna elements 330 via a coupler structure 326.

For receive functionality using the antenna array 330, each antenna element has its own receive signal chain. The plurality of parallel transceiver circuits 312 comprise, in a receive mode, an antenna duplexer 324 providing a received signal to a low-noise amplifier (LNA) 332. The LNA 332 provides amplified versions of the received signals to respective quadrature ('I' and 'Q') down-conversion stages 334 arranged to down-convert the respective amplified received signals based to a frequency down-conversion signal. Down conversion signals are fed in quadrature format from a local oscillator generation sub-system 340. The respective quadrature down-converted amplified received signals are input to respective low-pass filters 336 and thereafter to respective analogue-to-digital converters 338 to transform the quadrature down-converted received signal to a digital form.

In accordance with embodiments of the invention, the digital form of the various received signals of a single polarisation type, e.g. −45 degree is input to a plurality of parallel beam-form processing modules 344.

Notably, in accordance with embodiments of the invention, beamforming processing involves application of phase, amplitude and/or latency scaling of each individual receive signals that correspond to beam pattern coefficients stored and indexed from the LUT (Look Up Table) 342. As will be appreciated by skilled artisans, use of a LUT for the mechanism for indexing coefficients could alternatively be replaced by, for example, an index applied to a software routine that generates the beamform coefficient results required for said index.

Each of the plurality of parallel beam-form processing modules 344 comprise respective module arranged to process beam-forming and subsequent channel filtering. The parallel beam-form processing module modules 344 process the received digital form of the signals using respective channel filters, beamform weight amplitude, phase and/or latency applications and provide output signals. Each of the digital output signals in 'I' and 'Q' format will be additively combined 346. Thus, in the digital domain filtering, beam-form weighting and calibration correction is performed on each receive path. These are output through the OBSAI RP3 01 or CPRI interface 302 to the Node B baseband.

Likewise, for receive diversity processing, each of a plurality of parallel receiver circuits 374 comprise, in a receive mode, a receive band-pass filter 376 providing a received signal to a low-noise amplifier (LNA), 378. The LNA 378 provides amplified versions of the received signals to respective quadrature ('I' and 'Q') down-conversion stages 382 arranged to down-convert the respective amplified received signals to a frequency down-converted signal. Down converted signals are fed in quadrature format from a local oscillator generation sub-system, 380. The respective quadrature down-converted amplified received signals are input to respective low-pass filters 384 and thereafter to respective analogue-to-digital converters 386 to transform the quadrature down-converted received signal to a digital form.

In accordance with embodiments of the invention, the digital form of the various received signals of a single polarisation type, e.g. −45 degree is input to a plurality of parallel beam-form processing modules 392. Beam-form processing involves application of phase, amplitude and/or latency scaling of each individual receive signal that corresponds to a beam pattern co-efficient 390.

Each of the plurality of parallel beam-form processing modules 392 comprise a respective module arranged to process beam-forming and subsequent channel filtering. The parallel beam-form processing modules 392 process the received digital form of the signals using respective channel filters and provide output signals. Each of the digital output signals in 'I' and 'Q' format will be additively combined 394. The output of the beam-forming process results in digital signal representative of signals received substantially within the processed beam formation.

It is envisaged that power management functions and clock generation functions may be used within the network element 300, but are not shown in the diagrams for the sake of simplicity. In accordance with embodiments of the invention a Layer-1 controller module 350 has a function of controlling the sequence of start-up and power down of, and configuration, of various subsystem components, such as for example the receive frequency channel in the receiver elements. In some embodiments, the Layer-1 controller 350 is also arranged to initiate calibration or spatial scan functions, as configured via information transferred from the Node B baseband through the OBSAI RP3 01 or CPRI interface. Since this device operably connects to substantially all elements of the network element 300, connections are not shown in diagram for the sake of simplicity.

In accordance with embodiments of the invention, calibration of the antenna array and application of correction coefficients are controlled by calibration controller module 352. The calibration controller module 352 is, thus, operably coupled to the parallel beam-form processing module modules 310, 344, 392. The calibration controller module 352 is operably coupled to a beam scan module 396, which, in one example, is arranged to perform a narrow beam sector scan for the cell and measure the power per angular arrival of uplink signals. The beam scan module 396 records the measured data and builds up a database of incoming signal power vs. angle of arrival vs. (optionally) time.

In accordance with various embodiments of the invention, the beam scan module 396 may contain instantiations of elements, parallel beam-form processing modules 344, 392 and additive combining units 346, 394. In some embodiments, the analogue-to-digital converter (ADC) 386, 388 digitised signal outputs may be operably coupled to multiple beamform processing modules in parallel without impacting the performance of the receiver. Advantageously, this allows for 'live' network traffic, as transferred to the node B baseband through the OBSAI RP3 01 or CPRI interface, to be used since parallel beam-form processing modules 344, 392, and additive combining units 346, 394 contained within beam scan module 396 are not a conflicted resource with live network traffic processing. In radio frequency-based and analogue-based beamforming apparatus', such resources can not be shared without significantly compromising receiver performance, as signals would need to be split resulting in significantly impaired signal-to-noise ratio per receiver path. Known digital domain implementations do not include a separate signal processing for the purpose of spatial scan.

As mentioned, the beam scan module 396 records the measured data and builds up a database of incoming signal power vs. angle of arrival vs. (optionally) time. In most cases, the beam scan module 396 may record/store in the database values of power, or a power squared value, as an absolute value in units of Watts, dBm, Watts squared or dBV, whichever is deemed most practical when compiling the database. Often, conversion to these units may require further computational steps, such as log and divide functions. In some embodiments, scaling to a unit measurement, if required, would therefore be provided for off-line, when the database of the results is processed. Furthermore, it is envisaged that, in some embodiments, adjustments may be made to measured results to compensate for known configurations of the receiver processing chain, such as, for example AGC (Automatic Gain control) settings that may affect the measured results. Such adjustments may therefore be used to improve measurement accuracy when converting to absolute power units. As a consequence results stored in the database may be considered as being representative of absolute input power rather than absolute power measurements conforming to, for example, SI units.

Furthermore, Angle of Arrival value(s) will be confined to a finite resolution of the beam being processed, as such an angle of arrival of will be confined to signals substantially within the beam that is being processed. However, it is known that some smearing may occur where a signal power not incident on the angle of arrival is not substantially spatially filtered to another. In this case, strong signals from this non incident AoA may induce an increased power level on the AoA under measurement. However, since the smearing ratio of all AoA to each other is known at the time of beam weight coefficient synthesis, such smearing can be substantially eliminated in off-line database processing, if required, thereby further improving the power measurement accuracy and AoA resolution.

The database information may be used in some examples to detect interference sources. In some examples, the database information is used in optimisation routines for cellular network cell clusters, such that load balancing and coverage enhancements can be realised. These enhancements can be realised by adjustments controlled at the OMC level, locally within the RNC of the network, within the active panel antenna or by the physical adjustment of infrastructure components.

In example embodiments of the invention, the time information of the signal scan measurement may be scheduled in advance, for example in the active panel antenna unit, by storing predefined start times in memory. Such scheduling may be configured over the OBSAI RP3 01 or CPRI interface. Furthermore, in some examples, the antenna unit may have the ability to achieve real time clock synchronisation from data sent on over the interface from the Node B baseband, or from signals derived from a timing reference source, such as a GPS receiver. This timing information may be used to derive a trigger for the state machine controlling the spatial scan.

If scheduling is controlled by another part of the network infrastructure, such as the OMC, then in one example the database time stamp information may be appended to the database when the information is delivered back to the scheduling element. Any such trigger to perform a scan may then be routed through the Node-B baseband-to-active panel antenna interface.

The calibration signal generation and feedback transceiver circuitry 363 comprise a plurality of digital input/output ports coupled to the calibration controller module 352 and arranged to provide or receive digitized IQ signals. The calibration signal generation and feedback transceiver circuitry 363 comprises digital to analogue conversion, 354, to generate complex baseband analogue signals. The analogue signals are filtered, 356, and frequency translated, 360, to the desired RF band. The calibration signal generation and feedback transceiver circuitry 363 also comprises respective quadrature ('I' and 'Q') down-conversion stages 366 arranged to down-convert the respective amplified received signals to a frequency down-converted signal. Down converted signals are fed in quadrature format from a local oscillator generation sub-system, 368. The respective quadrature down-converted amplified received signals are input to respective low-pass filters 370 and thereafter to respective analogue-to-digital converters 372 to transform the quadrature down-converted received signal to a digital form.

The calibration signal generation and feedback transceiver circuitry 363 comprises a double-pole double-throw switch 362 arranged to route a single feedback or calibration signal to the coupler structure 326 via a switchplexer 364. The function of the calibration signal generation and feedback transceiver circuitry 363 is to connect the feedback point to the respective coupler path under calibration measurement. For receive calibration the calibration signal generation and feedback transceiver circuitry 363 is arranged to up-convert the calibration signal to the frequency of operation of the receiver under measurement. For transmit operation, the calibration signal generation and feedback transceiver circuitry 363 is arranged to down-convert to baseband the RF signal under test of the transmitter. Advantageously, much of the feedback or signal generation is common, thereby minimising impact to measurement results in conjunction with the normalising algorithm.

Referring now to FIG. 4, an example of a part of a network element 400, adapted to perform beamforming signal processing in accordance with some embodiments of the invention, is illustrated. For receive functionality, each of the antenna elements of an antenna array 330 is connected 328 through the coupler structure 326 to its own dedicated receiver path, as previously described with reference to FIG. 3. Thus, in a receive mode, a plurality of parallel transceiver circuits 312 comprises an antenna duplexer providing a received signal to a low-noise amplifier (LNA) 332. The LNA 332 provides amplified versions of the received signals to respective quadrature ('I' and 'Q') down-conversion stages 334 arranged to down-convert the respective amplified received signals based to a frequency down-conversion signal. Down conversion signals are fed in quadrature format from a local oscillator generation sub-system 340. The respective quadrature down-converted amplified received signals are input to respective low-pass filters 336 and thereafter to respective analogue-to-digital converters 338 to transform the quadrature down-converted received signal to a digital form. In accordance with embodiments of the invention, the digital form of the various received signals of a single polarisation type, e.g. −45 degree is input to a plurality of parallel beam-form processing module modules 344. It will be appreciated by skilled artisans that a receiver choice may vary from the one described to include, for example, one or more intermediate down conversion stages, an architecture that is often referred to as a superheterodyne receiver.

In one example, the sector beam scan module 396 of FIG. 3 is arranged to process a sufficiently narrow beam and angular index this narrow beam through a sector, with the results processed by one of the parallel beam-form processing modules 344. In this manner, the incident signal on the antenna elements is spatially filtered by the beam-form processing modules 344. Each beam-form processing module 344 is arranged to adjust the phase, amplitude and in some cases latency of the down converted signal, such that, when added, signals from a particular direction are added in a substantially coherent fashion. In some cases it is desirable to additionally scale the down-converted signal of each receiver path within the beam-form processing module modules 344, such that any phase, amplitude or latency mismatches detected through a calibration process between the separate receivers is normalised.

Notably, in accordance with embodiments of the invention, beam-form processing may involve application of phase, amplitude and/or latency scaling of each individual receive signal that corresponds to a beam pattern coefficients stored and indexed from the LUT 342. Each of the plurality of parallel beam-form processing module modules 344 comprise respective module arranged to process beamforming and subsequent channel filtering. The parallel beam-form processing modules 344 process the received digital form of the signals using respective channel filters, beamform weight amplitude, phase and/or latency applications and provide output signals. Each of the digital output signals in 'I' and 'Q' format are additively combined 346. In this example, the respective summations are output to power measurement module 402, which in this example calculates an $I^2+Q^2$ value for each sample pair.

The instantaneous power in a complex signal can be calculated by:

$$P_n=\sqrt{I_n^2+Q_n^2} \qquad [1]$$

Where:

n is the sample index.

For the purposes of this example it is not necessary to perform the square root function. Instead a $P^2$ value can be stored. Square root functions are computationally intensive and thus, in this example the square root calculation is, if required, performed off-line when the database of each of the results is processed.

The output of the power measurement module is input to a mean power squared module 408, which is arranged to calculate:

$$P^2_{AoA,T} = \frac{\sum_{n=1}^{N}(I_n^2+Q_n^2)}{N} \qquad [2]$$

Where:

N is the amount of samples per angular power measurement,

AoA is the angular index, and

T is the time index.

The AoA index employed by the beam scan module 396 corresponds to the beam angle to which power is measured. In one example, this function is arranged to increment in predefined angular increments across the 180° plane of measurement. In some examples, this cycle is arranged to repeat at predefined intervals in time or may repeat indefinitely. In some examples, the time index (in a form of a time stamp 414) is also logged for each measurement. In some examples, the time index parameter may be configurable, for example by a state machine, and or software code, as shown in FIG. 5. Thus, various parameters are measured and recorded in database 418.

Furthermore, in some examples, radio frequency power levels may be detected without having to process the incoming signals. Thus, as the scanning beam is a relatively narrow beam, some examples of the invention may utilise detected power levels to determine user/UE activity within the scanned beam. Thus, in the context herein described, the processing of at least one signal from at least one remote wireless communication unit, to identify signal parameters representative of incoming signal power and angle of arrival, may comprise actually processing and demodulating the at least one signal and/or purely detecting a power level of at least one received signal and determining an angle of arrival of the detected signal based on the current beam scan.

Referring now to FIG. 5, an example of a flowchart 500 for processing the beamforming signals of FIG. 4 is illustrated in accordance with some embodiments of the invention. In some examples, some or all of the steps illustrated in the flowchart may be implemented in hardware and/or some or all of the steps illustrated in the flowchart may be implemented in software.

The flowchart starts in step 505 and, for example, the state machine then synchronises any timing mechanism with a real time clock in step 510, so that the angular measurements can be logged with respect to real time. In step 515, a $1^{st}$ angular set of beam form coefficients is read from a look-up table (LUT) corresponding to the $1^{st}$ angular beam measurement.

Each of the receive paths and beamform chains generates respective 'I' and 'Q' samples corresponding to the signal received in this angular position. In step 520, an $I^2+Q^2$ calculation is then performed on each sample. A finite number of samples may be considered for a power measurement. It is advantageous to average the measurement results of individual samples, as shown in step 525, in order to minimise the effects of instantaneous fluctuations in received power caused by received amplitude modulation (AM) components and fading effects. Fading is a propagation impairment phenomenon induced by UE mobility.

In one example embodiment, the number of samples considered for measurements may be configurable at a state machine level, and would likely depend on a number of parameters, for example such as the air interface modulation scheme employed, UE speed support, scan speed, etc. The measurements are then stored in a suitable format, for example the arithmetic mean power squared value, a time value, an AoA index, etc. as shown in step 530.

A determination is made in step 535 as to whether the last AoA index has been sampled, and, if not, the AoA is incremented in step 540 and the process loops back to step 515 until all AoA indices have been processed.

If the last AoA index has been sampled and processed, a determination is made in step 545 as to whether the database is complete, and if not the algorithm may decide to take further measurements of the various AoA indices in step 550 and the process again loops back to step 515 until all AoA indices are completed. Otherwise, if the database is complete in step 545, the state-machine may be arranged to terminate the calculations in step 555.

In some examples, functions described as algorithmic state machine operations in this description may equally be seen as processing steps on the signal path. Thus, in some examples performing $I^2+Q^2$ in step 520 may be interpreted as a hardware processing step from the apparatus, as much as a subset of a software state-machine function for the measurement process.

Referring now to FIG. 6, azimuth patterns 600 of beam formation, illustrating an indexing operation through a spatial scan of the antenna array, is shown in accordance with some embodiments of the invention. For example, the indexing of the beamforming is shown at 60°, 90° and 120°. For the purpose of simplicity only, the beamform for each and every AoA indices used is not shown.

Referring now to FIG. 7 a graphical example 700 of an output of the spatial scan of FIG. 6 is illustrated, in accordance with embodiments of the invention. The resultant output from the beam scan is effectively zero where in angles of no signal input power the result is floored by noise. Various power levels 705 that are determined as exceeding the noise floor are detected. In one example, these power levels 710 may be used in conjunction with call log activity in the Node B. An example of this embodiment may include a power scan that is executed where no call processing has been carried out by the Node B. In this situation, there should be no incident power that exceeds the noise floor and is comparable to that required for call processing traffic induced signals from any angle of arrival.

Thus, if a power scan measurement results in measurements that exceed the noise floor to be comparable to that required for call processing traffic from discreet angles of Arrival, these measurements may be assigned as 'interference sources'. Node B call log processing activity is known by various parts of network infrastructure elements, such as RNC 220 in FIG. 2. Furthermore, in some embodiments, OMC 215 of FIG. 2 may be configured to compare call log activity of the Node B and the power levels 710 that have been measured in order to determine a receive beam formation that mitigates against such interference sources. As such, this procedure may be used to identify interference sources within the sector. Thus, corrective mitigating beam processing may further be applied to the receive or the transmit beam shapes in the sector to reduce the impact of interference source on performance.

Furthermore, in implementations where more than one beam is processed by the Node B, as described in the Applicant's co-pending GB application 0902407.6, the placement of secondary beams that maximally overlap the main beam may be dynamically decided by the active panel antenna device, Node B baseband or OMC in order to improve uplink performance in the network. It may be determined from a spatial scan measurements that placement of secondary receive beams may be placed in overlap regions that optimally maximise the performance of such a link. This determination may be made by placement of beams that spatially filter signals that may be considered interference sources. Similarly, the determination may be used to add secondary beams, where distribution peaks are centred, such as the profile described in plot 700. In this case, a bi-modal distribution is formed. Thereafter, optimum placement of secondary sub-sector beams centred on the angles of peak distribution of incident power, as described in the Applicant's co-pending GB application 0902407.6, will improve uplink performance. In the case of the example illustrated in the plot 700 of FIG. 7, secondary sub-sector beams may be centred on, say, 40 degrees and 140 degrees.

Embodiments of the invention may also employ aspects of the active panel antenna technology utilising multiple Node B receive beam-forming paths, as described in the Applicant's co-pending GB application 0902407.6. Here, the multiple Node B receive beam-forming paths can support an Eb/No (Energy per bit) of a particular user/UE benefiting from spatial filtering of multiple receive paths. This aspect may be achieved with a combination of sector receiver and one or more selective (sub-sector) rake receivers, as used in WCDMA or CDMA technologies, where the signals of a subset of UEs may be arranged to be processed within the one or more sub-sector beams. Thus, in one embodiment of the invention, multiple digital receive patterns (for example in a form of sub-sector beams) may be formed and digital signal processing (DSP) (arranged to implement the active array technology) may then exploit the spatial filtering of the beam forming process. Embodiments of the invention may allow improved use of the communication resources in the communication system, for example, in a sector where UE angle of arrival signals are equally distributed spatially. Thus, for an uplink UE with a beam arrival concentrated on any one of the sub-sector beams, the sub-sector beams may contain substantially less interference from other users as compared to the received signal being processed as an entire beam. Thus, as a result, an improvement in SIR (signal to interference ratio) performance may be achieved, thereby improving the quality of the air interface link. Furthermore, such a communication system may be leveraged by already developed 3GPP standards in order to provide improved link performance on 3G WCDMA systems.

Referring now to FIG. 8, an example of a part of an alternative network element 800, adapted to perform beamforming signal processing in accordance with some alternative embodiments of the invention, is illustrated. The embodiment illustrated in FIG. 8 relates to a transceiver array and associated Node B conversion circuitry that is arranged to support beam scanning that uses an antenna matrix array with a few columns. The embodiment illustrated in FIG. 8 details a beam scan module that employs two beamformer processing units 344, 392, arranged in parallel. In one example, both beamformer processing units 344, 392 are arranged to have similar HPBW. However, in one example, one beam pattern invokes a null at the bore sight, as described with reference to FIG. 9 and FIG. 10, where the power difference between the resultant beam power measurements is used to determine the angular incident power. The difference in the power between the two beams of FIG. 9 and FIG. 10 allows a power scan measurement profile to accurately discern angular arrival within the sector. Thus, in some examples, the power in each beam is measured and the difference power is calculated. However, in some examples, a difference beam may first be generated, with a resultant power measurement performed on the difference beam.

Circuitry and processes described previously with reference to FIG. 3 and FIG. 4 will not be described further with regard to FIG. 8 for simplicity purposes only. In one example, the sector beam scan module 396 of FIG. 3 is arranged to generate a sufficiently narrow beam and index this narrow beam through a sector, with the results processed by one of the parallel beam-form processing modules 344, 392. In the context of examples of embodiments of the invention, a narrow beam is a beam that has a HPBW of at most half the main receiver processing HPBW of the entire sector. This beam width will allow beam resolution to within one half of a sector bandwidth. In some examples, more refined scan profiles may be generated with a HPBW on the scan beam to be any resolution finer than this.

The state-machine 401 is operably coupled to multiple control points within the apparatus not shown for the sake of simplicity. The state machine module 401 can be embodied as a software routine, as a hardcoded digital state machine implementation, or any combination thereof. One function of the state machine module 401 is to orchestrate implementation of algorithm as illustrated for example in FIG. 5. In this context, the state machine module 401 would include configuration of beamform weights to beamform modules 344, 392. The state machine module 401 may also be arranged to determine sample lengths of received signals considered for measurement, initiate averaging function, store measurement result values to memory location, apply index terms to result values, increment the loop for further AoA measurements (as illustrated in the flowcharts of FIGS. 5, 8 and 14), determine end of spatial scan measurements, etc. Skilled artisans will appreciate that the state machine module 401 may, in some embodiments, be arranged to be a subset of the layer-1 controller 350.

In this manner, the incident signal on the antenna elements is spatially filtered by the beam-form processing modules 344, 392. Each beam-form processing module 344, 392 is arranged to adjust the phase, amplitude and in some cases latency of the down converted signal, such that, when added, signals from a particular direction are added in a substantially coherent fashion. In some cases it is desirable to additionally scale the down-converted signal of each receiver path within the beam-form processing modules 344, 392, such that any phase, amplitude or latency mismatches detected through a calibration process between the separate receivers is normalised. The calibration process may use global calibration correction coefficients for all AoA beam index terms to tune the antenna elements for accurate beam scanning.

Notably, in accordance with embodiments of the invention, beam-form processing involves application of phase, amplitude and/or latency scaling of each individual receive signal that corresponds to a beam pattern coefficients stored and indexed from the LUTs 342, 390. LUTs are instantiated more than once in drawings for the purposes of explanation. However it will be appreciated by skilled artisans that such LUT instantiations, such as those implemented in solid state memory, could be from a single module or device instantiation. Each of the plurality of parallel beam-form processing modules 344 comprise a respective module arranged to process beam-forming and subsequent channel filtering. The parallel beam-form processing modules 344, 392 process the received digital form of the signals using respective channel filters, beamform weight amplitude, phase and/or latency applications and provide output signals. Each of the digital output signals in 'I' and 'Q' format are additively combined 346, 394. In this example, each of the respective summations are output to respective power squared measurement modules 802, 804. In this example, each power squared measurement module 802, 804 calculates an $I^2+Q^2$ value for each sample pair, where the instantaneous power squared in the complex signal is illustrated in [1].

Again, for the purposes of this example, it is not necessary to perform the square root function. Instead a $P^2$ value can be stored. Square root functions are computationally intensive and thus, in this example the square root calculation is performed, if required, off-line when the database of each of the results is processed. The two power squared measurements output from power squared measurement module 802, 804 are then compared in comparison module 806.

The output of the comparison module 806 is input to a mean power squared module 808, which is arranged to calculate the squared power value as illustrated in [2]:

The AoA index employed by the beam scan module again corresponds to the beam angle to which power is measured. In one example, this function is arranged to increment in predefined angular increments across the 180° plane of measurement. In some examples, this cycle is arranged to repeat at predefined intervals in time or may repeat indefinitely. In some examples, the time index (in a form of a time stamp 814) is also logged for each measurement. In some examples, the time index parameter may be configurable, for example by a state machine, and or software code, as shown in FIG. 12. Thus, various parameters are measured and recorded in database 810, for example incoming signal power vs. angle of arrival vs. time. The database information may be used in some examples to detect interference sources. In some examples, the database information is used in optimisation routines for cellular network cell clusters, such that load balancing and coverage enhancements can be realised. These enhancements can be realised by adjustments controlled at the OMC level, locally within the RNC of the network, within the active panel antenna or by the physical adjustment of infrastructure components.

In example embodiments of the invention, the time information of the signal scan measurement may be scheduled in advance, for example in the active panel antenna unit, by storing predefined start times in memory. Such scheduling may be configured over the OBSAI RP3 01 or CPRI interface. Furthermore, in some examples, the antenna unit may have the ability to achieve real time clock synchronisation from data sent on over the interface from the Node B baseband, or from signals derived from a timing reference source, such as a GPS receiver. This timing information may be used to derive a trigger for the state machine controlling the spatial scan.

If scheduling is controlled by another part of the network infrastructure, such as the OMC, then in one example the database time stamp information may be appended to the database when the information is delivered back to the scheduling element. Any such trigger to perform a scan may then be routed through the Node-B baseband-to-active panel antenna interface.

FIG. 9, FIG. 10 and FIG. 11 illustrate an example of azimuth patterns of beam formation for indexing through a spatial scan in accordance with some embodiments of the invention. In particular, referring now to FIG. 9, an example of an azimuth pattern of beam formation using a notch beam 905 (highlighted in a dotted line) for indexing through a spatial scan is illustrated. McNamara's paper "Performance of Zolotarev and modified-Zolotarev difference pattern array distributions" in Microwaves, Antennas and Propagation, IEE Proceedings-Volume 141, Issue 1, February 1994 pages: 37-44, has identified the Zolotarev polynomial as a preferred solution in generating a beam weight with a null at the bore sight.

The notch beam 905 is created using a standard sector type beam 910 (highlighted in a fixed line), with the same beam being replicated with an additional null at the bore sight applied. The two sector beams are then mathematically subtracted to form the notch beam 905. Beam weights derived from polynomials, such as Dolph-Chebyshev or modified Taylor distributions, are often used for beam form weights in antenna array solutions to provide a resultant beam similar to standard sector type beam 910. A power squared measurement is then completed by subtracting the power squared values received in both beams, the result of which will be the power squared in the notch region, as illustrated by the example azimuth pattern 1005 in the plot 1000 of FIG. 10. Advantageously, in scanning this generated beam across the horizontal plane, an accurate representation of angular incidence of arrival can be obtained. A state machine similar to the example shown in FIG. 4 and FIG. 5 may be utilised to sweep across the horizontal azimuth plane.

In one example, further angular measurements may be undertaken by panning of both beams (indicated in FIG. 9 and FIG. 10) through the azimuth plane. The power measured would be equivalent to that of a single narrow beam antenna array, as shown in FIG. 9.

FIG. 11 shows a spatial example of a beam processing formation 1100 capable of using measurement information for AoA incident signals about −30° off the original boresight, as described in FIG. 9. This is shown as an example of beam processing used for one other of the AoA indices.

It is known to those skilled in the art that the gain of the receiver path may undergo change during a set of beam scan measurements, for example due to temperature variation or through AGC control. In one example, the beam scan measurements may be recorded with additional temperature and/or AGC information, which are recorded at the time the beam scan measurement is made. In one embodiment, AGC information, and or temperature information, may be appended to the database results so that scaling to a unit measurement, if required, would be provided for off-line processing of the measurement results contained in the database. In this manner, in one example, corrective action may be performed on the beam scan results to take into account any temperature variation or through AGC control.

Similarly, in a further example, a corrective adjustment may be made to beam scan measurements based on whether a high side-lobe beam magnitude exists in the antenna array beam formation and if it is known that a signal source exists at the side-lobe angle of arrival. The presence of side lobes will be known at synthesis of beam form weights. The presence of a signal on the side lobe will be known at the time of the beam scan from the measurement process. Thus, in a further example, corrective action may be taken in the measured results, so as to substantially limit the non-ideality in the beam generation from impairing the accuracy of such results.

Referring now to FIG. 12, an example of a flowchart 1200 for processing the beamforming signals of FIG. 8 is illustrated in accordance with an embodiment of the invention. In some examples, some or all of the steps illustrated in the flowchart may be implemented in a hardware state machine and/or some or all of the steps illustrated in the flowchart may be implemented in software.

The flowchart starts in step 1205 and, for example, the state machine then synchronises any timing mechanism with a real time clock in step 1210, so that the angular measurements can be logged with respect to real time. In step 1215, a $1^{st}$ angular set of beam form coefficients is read from a look-up table (LUT) corresponding to a $1^{st}$ angular beam measurement, for example applied to $1^{st}$ beamformer processing unit 344 of FIG. 8. In step 1220, a $2^{nd}$ angular set of beam form coefficients is read from a look-up table (LUT) corresponding to a $1^{st}$ angular beam measurement applied to $2^{nd}$ beamformer processing unit 392 of FIG. 8.

Each of the receive paths and beamform chains operably coupled with respective additive combining modules 346, 392 of FIG. 8, generate respective 'I' and 'Q' samples corresponding to the signal received, and these are spatially filtered by respective beamform coefficients. In step 1225, an $I^2+Q^2$ calculation is then performed on the respective sample pairs and a difference between respective $I^2+Q^2$ values is calculated. A finite number of samples may be considered for a power measurement. A determination is then made in step 1230 as to whether the last set of samples has been compared to a state machine configuration of a total number of samples to be considered in the measurement process. If, in step 1230, the last set of samples processed has not reached the comparison threshold of total samples considered for the measurement, the process loops back to step 1225. If, in step 1230, the last set of samples has reached the comparison threshold of total samples considered for the measurement, the process moves to step 1235, where an arithmetic mean of the difference between respective samples from the respective beamforming processes is calculated. It is advantageous to average the power measurement samples, as shown in step 1235, in order to minimise the effects of instantaneous fluctuations in received power caused by received amplitude modulation (AM) components and fading effects. Fading is a propagation impairment phenomenon induced by UE mobility. The measurements are then stored in a format, for example the arithmetic mean power squared value, a time value, an AoA index step 1240.

A determination is made in step 1245 as to whether the last AoA index has been sampled, and, if not, the AoA is incremented in step 1250 and the process loops back to step 1215 until all AoA indices have been processed, thereby indexing a new set of AoA beamform weights to the beamform apparatus' in the process.

If the last AoA index has been sampled and processed in step 1245, a determination is made in step 1255 as to whether the database is complete, and if not the algorithm may reset the AoA indices in step 1260 and the process again loops back to step 1215 until all AoA indices are completed. Otherwise, if the database is complete in step 1255, the state-machine may be arranged to terminate the calculations in step 1265.

In some examples, functions described as state machine operations in this description may equally be seen as processing steps on the signal path. Thus, in some examples performing $I^2+Q^2$ in step 1225 may be interpreted as a processing step from the apparatus, as much as a subset of a software-based state-machine function for the measurement process.

Referring now to FIG. 13, a yet further example of a network element 1300 adapted to perform beamform signal processing is illustrated in accordance with a yet further alternative embodiment of the invention. The preceding examples of network elements in FIG. 4 and FIG. 12 employ sector scan measurements using a single receiver array.

However, dual angular polarisation is employed in most receive applications of cellular Node B antenna systems. This is where receivers are connected to antenna array elements of common angular polarisation. Typically +45° and −45° angular polarised antenna array elements are used. Thus, in contrast to the aforementioned network elements, FIG. 13 illustrates a more accurate power measurement when signals of both angular polarisation are employed.

The embodiment illustrated in FIG. 13 relates to a transceiver array and associated Node B conversion circuitry that is arranged to support beam scanning that uses an antenna matrix array with a few columns. The embodiment illustrated in FIG. 13 again details a beam scan module that employs two beamformer processing units 344, 392 in parallel, but with each respective beamformer processing unit 344, 392 duplicated, with one 'pair' arranged to provide +45° angular polarised antenna arrays and one 'pair' arranged to provide −45° angular polarised antenna arrays. In one example, both beamformer processing units 344, 392 are arranged to have similar HPBW.

Circuitry and processes described previously with reference to FIG. 3 and FIG. 4 will not be described further with regard to FIG. 13 for simplicity purposes only. In one example, the sector beam scan module 396 of FIG. 3 is arranged to generate a sufficiently narrow beam and index this narrow beam through a sector, with the results processed by one of the parallel beam-form processing modules 344, 392. In this manner, the incident signal on the antenna elements is spatially filtered by the beam-form processing modules 344, 392. Each beam-form processing module 344, 392 is arranged to adjust the phase, amplitude and in some cases latency of the down converted signal, such that, when added, signals from a particular direction are added in a substantially coherent fashion. In some cases it is desirable to additionally scale the down-converted signal of each receiver path within the beam-form processing modules 344, 392, such that any phase, amplitude or latency mismatches detected through a calibration process between the separate receivers is normalised.

Notably, in accordance with embodiments of the invention, beam-form processing involves application of phase, amplitude and latency scaling of each individual receive signal that corresponds to beam pattern coefficients stored and indexed from the LUT 342, 390. Each of the plurality of parallel beam-form processing modules 344 comprise a respective module arranged to process beam-forming and subsequent channel filtering. The parallel beam-form processing modules 344, 392 process the received digital form of the signals using respective channel filters, beamform weight amplitude, phase and/or latency applications and provide output signals. Each of the digital output signals in 'I' and 'Q' format are additively combined 346, 394. In this example, each of the respective summations, from each pair, is output to respective power squared measurement modules 1302, 1304, 1318, 1320, which each calculate an $I^2+Q^2$ value for each sample pair, where the instantaneous power squared in the complex signal is illustrated in [1]. Again, for the purposes of this example, it is not necessary to perform the square root function. Instead a $P^2$ value can be stored. Square root functions are computationally intensive and thus, in this example the square root calculation is performed off-line, if required, when the database of each of the results is processed.

In this example, a first pair of power squared measurement modules processing beams of the same angular polarised antenna array type 1302, 1318 is summed in summation module 1316. In this example, a second pair of power squared measurement modules processing beams of the same angular polarised antenna array type 1304, 1320 is summed in summation module 1322. The output from each of the summation modules 1316, 1322 is then input to a difference module 1306 to determine the power squared difference between the signals processed by the +45° angular polarised antenna arrays and the −45° angular polarised antenna arrays. The output of the difference module 1306 is input to a mean power squared module 1308, which is arranged to calculate the squared power as illustrated in [2]. The description herein, solely for the purposes of simplicity, uses multiple instantiations of power square measurement modules. Skilled artisans will appreciate that said modules could be resource-shared on a time basis in order to provide required measurement processing step, thus reducing the hardware resources required for such functions.

Again, the AoA index employed by the beam scan module again corresponds to the beam angle to which power is measured. In one example, this function is arranged to increment in predefined angular increments across the 180° plane of measurement. In some examples, this cycle is arranged to repeat at predefined intervals in time or may repeat indefinitely. In some examples, the time index (in a form of a time stamp 1314) is also logged for each measurement. In some examples, the time index parameter may be configurable, for example by a state machine, and or software code, as shown in FIG. 12. Thus, various parameters are measured and recorded in database 1310.

Alternatively, this embodiment may measure the power level from separate diversity paths and output beam power squared values added as separate entries to the database 1310. This would mean bypassing the difference module 1306 and addition modules 1316, 1332. In this example the difference calculation is performed, if required, off-line when the database of each of the results is processed.

Referring now to FIG. 14, an example of a flowchart 1400 for processing the beamforming signals of FIG. 13 is illustrated in accordance with an embodiment of the invention. In some examples, some or all of the steps illustrated in the flowchart may be implemented in a hardware state machine and/or some or all of the steps illustrated in the flowchart may be implemented in software.

The flowchart starts in step 1205 and, for example, the state machine then synchronises any timing mechanism with a real time clock in step 1210, so that the angular measurements can be logged with respect to real time. In step 1410, a $1^{st}$ angular set of beam form coefficients is read from a look-up table (LUT) corresponding to a $1^{st}$ angular beam measurement, for example applied to $1^{st}$ beamformer processing unit 344 of FIG. 13. This $1^{st}$ angular set of beam form coefficients is indexed by AoA to both the primary path and the diversity path, as described with reference to FIG. 13. In step 1420, a $2^{nd}$ angular set of beam form coefficients is read from a look-up table (LUT) corresponding to a $2^{nd}$ angular beam measurement, for example applied to $1^{st}$ beamformer processing unit 392 of FIG. 13. This $2^{nd}$ angular set of beam form coefficients is indexed by AoA to both the primary path and the diversity path, as described with reference to FIG. 13.

Each of the receive paths and beamform chains operably coupled with respective additive combining modules 346, 392 of FIG. 13, generate respective 'I' and 'Q' samples corresponding to the signal received, and these are spatially filtered by respective beamform coefficients. In step 1430, an $I^2+Q^2$ calculation is then performed on the difference beam sample pairs on the common polarisation type. A finite number of samples may be considered for a power measurement. In step 1440, the $I^2+Q^2$ values of the output of beam processes of common beamweights are then added.

A determination is then made in step 1230 as to whether the last set of samples has been compared to a state machine configuration of a total number of samples to be considered in the measurement process. If, in step 1230, the last set of samples processed has not reached the comparison threshold of total samples considered for the measurement, the process loops back to step 1430. If, in step 1230, the last set of samples has reached the comparison threshold of total samples considered for the measurement, the process moves to step 1235, where an arithmetic mean of the difference between respective samples from the respective beamforming processes is calculated. It is advantageous to average the power measurement samples, as shown in step 1235, in order to minimise the effects of instantaneous fluctuations in received power caused by received amplitude modulation (AM) components and fading effects. Fading is a propagation impairment phenomenon induced by UE mobility. The measurements are then stored in a format, for example the arithmetic mean power squared value, a time value, an AoA index step 1240.

A determination is made in step 1245 as to whether the last AoA index has been sampled, and, if not, the AoA is incremented in step 1250 and the process loops back to step 1410 until all AoA indices have been processed, thereby indexing a new set of AoA beamform weights to the beamform apparatus' in the process.

If the last AoA index has been sampled and processed in step 1245, a determination is made in step 1255 as to whether the database is complete, and if not the algorithm may reset the AoA indices in step 1260 and the process again loops back to step 1410 until all AoA indices are completed. Otherwise, if the database is complete in step 1255, the state-machine may be arranged to terminate the calculations in step 1265.

In some examples, functions described as state machine operations in this description may equally be seen as processing steps on the signal path. Thus, in some examples performing $I^2+Q^2$ in step 1430 may be interpreted as a processing step from the apparatus, as much as a subset of a software-based state-machine function for the measurement process.

In one example, power squared measurements stored in the database 410, 810, 1310 additionally comprise both the signal power squared measured in the main sector beams (e.g. $I^2+Q^2$ values), as processed by the baseband processing unit on the Node B. This aggregate power term is measured at the same time as the spatial scan measurement is performed. In this manner, relative accurate ratios of scan measurement with respect to the entire beam can be obtained.

Thus, the hereinbefore examples provide a sector scan apparatus and database logging apparatus for use in existing and future wireless networks. In particular, the hereinbefore examples of apparatus and methods are capable of compiling a database of incoming signal power vs. angle of arrival vs. recorded time, for a plurality of cell sectors in a cellular network. In one example, a two beam solution is described, whereby a broad beam and the corresponding broad beam with a notch are combined to produce a narrow beam scan. In one example a narrow beam scan is used. In one example, beam power calculations using combined angular diversity paths are performed for the power measurement. In addition, power measured in the main beams, as processed by the network element baseband, may also be compiled and recorded into the database 410, 810, 1310. In one example, the power measurements are also averaged to normalise for fading or modulation peaks or troughs.

Furthermore, a state machine for compiling and controlling the database records is described. In one example, the database compilation is commenced and controlled on a time of day basis, for example the beam scan operation and data recording is performed during peak cell loading periods. Peak cell loading is classified as an operating condition of the cell where the number of users or data rate bandwidth supported in call processing approaches the maximum expected to be supported for the classification of network elements processing calls in said cell. In such circumstances, other cells within the local geographic cell cluster may not experience same loading profile. Network Operators may determine, from angular user power density measurements taken at such a peak loading time, a more optimum configuration of the network to load balance serving cells.

In further examples, the state machine may be arranged to control any number of parameters with regard to the scan profile from antenna unit, such as angular increment, the number of scan samples required, the time of scan, etc. For example, in one embodiment, the number of samples considered for measurements may be configurable and dependent on a number of parameters used, such as the air interface modulation scheme employed, UE speed support and scan speed.

In one embodiment of the invention, elements of this invention may be used in different classes of wireless serving equipment, these classified as macro, micro, pico and femto base stations. In one embodiment of the invention, modules of the network element hereinbefore described may be co-located with the antenna radiating elements, for example located on the same physical mounting structure within, say, five meters of each other. In one embodiment of the invention, co location of the antenna radiating elements may exist on the same physical structure, for example within a panel antenna array device. The examples of the invention embodiments described hereinbefore are described in context of a macro cell structure, however skilled artisans will appreciate the examples are equally applicable to other cell structures, for example in femto, pico or micro cell structures.

In one embodiment of the invention, the placement beam beam lobes can be used for improved uplink performance, as they can be derived from the power scan measurements. In one embodiment of the invention, such information may be obtained to identify interference sources, for which the network may react to substantially attenuate the interference and thereby improve link performance.

Although some aspects of the invention have been described with reference to their applicability to a UMTS (Universal Mobile Telecommunication System) cellular communication system and in particular to a UMTS Terrestrial Radio Access Network (UTRAN) of a 3$^{rd}$ generation partnership project (3GPP) system, it will be appreciated that the invention is not limited to this particular cellular communication system. It is envisaged that the concept described above may be applied to any other cellular communication system that is capable of utilizing antenna arrays. Furthermore, some embodiments of the invention may be applied to receiver arrays, such as used in a satellite receiver where the antenna array is arranged to scan both the vertical and horizontal azimuth planes to track an orbiting satellite's transmit beam. As such, power scan measurements would be used to update live communications processing channel beam formation so as to maximize the antenna gain in the direction of the satellite.

Referring now to FIG. 15, there is illustrated a typical computing system 1500 that may be employed to implement signal processing functionality in embodiments of the invention. Computing systems of this type may be used in access points and wireless communication units. Those skilled in the relevant art will also recognize how to implement the invention using other computer systems or architectures. Computing system 1500 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1500 can include one or more processors, such as a processor 1504. Processor 1504 can be implemented using a general or special-purpose processing engine such as, for example, a microprocessor, microcontroller or other control module. In this example, processor 1504 is connected to a bus 1502 or other communications medium.

Computing system 1500 can also include a main memory 1508, such as random access memory (RAM) or other dynamic memory, for storing information and instructions to be executed by processor 1504. Main memory 1508 also may be used for storing temporary variables or other intermediate information during execution of instructions to be executed by processor 1504. Computing system 1500 may likewise include a read only memory (ROM) or other static storage device coupled to bus 1502 for storing static information and instructions for processor 1504.

The computing system 1500 may also include information storage system 1510, which may include, for example, a media drive 1512 and a removable storage interface 1520. The media drive 1512 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1518 may include, for example, a hard disk, floppy disk, magnetic tape, optical disk, CD or DVD, or other fixed or removable medium that is read by and written to by media drive 1512. As these examples illustrate, the storage media 1518 may include a computer-readable storage medium having particular computer software or data stored therein.

In alternative embodiments, information storage system 1510 may include other similar components for allowing computer programs or other instructions or data to be loaded into computing system 1500. Such components may include, for example, a removable storage unit 1522 and an interface 1520, such as a program cartridge and cartridge interface, a removable memory (for example, a flash memory or other removable memory module) and memory slot, and other removable storage units 1522 and interfaces 1520 that allow software and data to be transferred from the removable storage unit 1518 to computing system 1500.

Computing system 1500 can also include a communications interface 1524. Communications interface 1524 can be used to allow software and data to be transferred between computing system 1500 and external devices. Examples of communications interface 1524 can include a modem, a network interface (such as an Ethernet or other NIC card), a communications port (such as for example, a universal serial bus (USB) port), a PCMCIA slot and card, etc. Software and data transferred via communications interface 1524 are in the form of signals which can be electronic, electromagnetic, and optical or other signals capable of being received by communications interface 1524. These signals are provided to communications interface 1524 via a channel 1528. This channel 1528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1508, storage device 1518, or storage unit 1522. These and other forms of computer-readable media may store one or more instructions for use by processor 1504, to cause the processor to perform specified operations. Such instructions, generally referred to as 'computer program code' (which may be grouped in the form of computer programs or other groupings), when executed, enable the computing system 1500 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1500 using, for example, removable storage drive 1522, drive 1512 or communications interface 1524. The control module (in this example, software instructions or computer program code), when executed by the processor 1504, causes the processor 1504 to perform the functions of the invention as described herein.

It will be appreciated that, for clarity purposes, the above description has described embodiments of the invention with reference to different functional units and processors. However, it will be apparent that any suitable distribution of functionality between different functional units or processors, for example with respect to the beamforming module or beam scanning module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A wireless network element operably couplable to an antenna array, wherein the wireless network element comprises:

a receiver arranged to receive and process at least one signal from at least one remote wireless communication unit via at least one first radiating element of the antenna array;

a beam scanning module arranged to sweep a radiation pattern created by the antenna array through a sector of a communication cell, such that the at least one signal from the at least one remote wireless communication unit is processed by the beam scanning module to identify signal parameters representative of incoming signal power and an angle of arrival index that corresponds to a beam angle to which the incoming signal power is measured, wherein the receiver and the beam scanning module are arranged to operate such that live traffic processing by the wireless network element is undisrupted;

a database operably coupled to the beam scanning module, the database arranged to record values representative of incoming signal power and angle of arrival index for a plurality of remote wireless communication units; and a signal processor arranged to determine an antenna parameter based on the values in the database and to provide the antenna parameter to a radiating element of the antenna array to thereby enable the radiation pattern to be adjusted.

2. The wireless network element of claim 1, wherein the beam scanning module is additionally arranged to identify a time parameter associated with the received at least one signal and the database is configured to record the time parameter.

3. The wireless network element of claim 1, wherein the radiation pattern comprises at least one from a group of:

a measurement beam having a narrow beam; or two measurement beams including a first measurement beam forming a broad beam and a second measurement beam forming a corresponding broad beam with an additional notch.

4. The wireless network element of claim 1, further comprising a dedicated signal processing path corresponding to each radiating element of the antenna array.

5. The wireless network element of claim 1, wherein the beam scanning module comprises a beam power calculation module arranged to calculate the incoming signal power by combining multiple angular diversity paths.

6. The wireless network element of claim 1, wherein the antenna array comprises an active panel antenna unit, such that the receiver is arranged to receive and process the at least one signal from the at least one remote wireless communication unit via the at least one first radiating element of the active panel antenna unit.

7. The wireless network element of claim 1, further comprising a controller module operably coupled to the beam scanning module and arranged to control at least one parameter associated with the operation of the beam scanning module with regard to at least one of the following: a scan profile of the antenna array, angular increment of a scan, a number of scan samples to be taken, or a time of scan.

8. The wireless network element of claim 1, wherein the receiver comprises an automatic gain control module and the beam scanning module is arranged to additionally store automatic gain control information associated with receiving and processing the at least one signal.

9. The wireless network element of claim 1, wherein the receiver and beam scanning module are arranged to determine a placement of secondary sub-sector receive beams used in call processing.

10. A method for beam scanning using an antenna array in a wireless cellular communication system that comprises a network element operably coupled to the antenna array, the method comprising:

sweeping a radiation pattern created by the antenna array through a sector of a communication cell;

identifying, from at least one signal received using at least one first radiating element of the antenna array, a plurality of signal parameters representative of incoming signal power and an angle of arrival index associated with said sweeping that corresponds to a beam angle to which the incoming signal power is measured of the received at least one signal, wherein said identifying is performed such that live traffic processing by the network element is undisrupted;

recording values representative of incoming signal power and angle of arrival index for a plurality of remote wireless communication units in a database when sweeping the radiation pattern through the sector of the communication cell;

determining an antenna parameter based on the values representative of the incoming signal power and the angle of arrival index associated with said sweeping; and adjusting the radiation pattern in the sector of the communication cell based on the antenna parameter.

11. The method of claim 10, wherein said sweeping is performed during peak cell loading periods.

12. A computer program product comprising program code that, when executed by a network element, causes the network element to perform operations comprising:

configuring at least one first radiating element of a plurality of radiating elements in an antenna array to create a radiation pattern in a sector of a communication cell;

sweeping the radiation pattern through the sector of the communication cell;

identifying, from at least one signal received by the antenna array, signal parameters representative of incoming signal power and an angle of arrival index associated with said sweeping that corresponds to a beam angle to which the incoming signal power is measured of the received at least one signal, wherein said identifying is performed such that live traffic processing by the network element is undisrupted;

recording values representative of incoming signal power and angle of arrival index for a plurality of remote wireless communication units in a database in connection with said sweeping the radiation pattern through the sector of the communication cell;

determining an antenna parameter based on the the values representative of the incoming signal power and the angle of arrival index from the database following the sweeping; and adjusting the radiation pattern in the sector of the communication cell based on the antenna parameter.

13. A wireless network element comprising:

a receiver arranged to process signals received from remote wireless communication units in a communication cell;

a beam scanning module in communication with the receiver, the beam scanning module arranged to:

control an antenna element of an antenna array operatively coupled with the wireless network element to sweep a radiation pattern through a sector of the communication cell;

identify signal parameters representative of incoming signal power and an angle of arrival index associated with the signals received from the remote wireless communications units; and cause values representative of the incoming signal power and the angle of arrival index to be stored in a database such that the values representative of the incoming signal power and the angle of arrival index are accessible subsequent to sweeping the radiation pattern through the sector of the communication cell, wherein the receiver and the beam scanning module are arranged to operate such that live network traffic processing by the wireless network element is undisrupted; and a signal processor arranged to determine an antenna parameter based on the values representative of the incoming signal power and the angle of arrival index stored in the database, and to provide the antenna parameter to the antenna array.

14. The wireless network element of claim 13, further comprising a plurality of polarisation diversity receive processors arranged to utilise polarisation diversity in processing the signals from the remote wireless communication units.

15. The wireless network element of claim 13, wherein the beam scanning module is arranged to average a plurality of incoming signal power measurements to thereby normalize the values representative of incoming power signal.

16. The wireless network element of claim 13, wherein the beam scanning module comprises a temperature monitoring module such that the beam scanning module is arranged to additionally store temperature information associated with receiving and processing the signals received from the remote wireless communication units.

17. The wireless network element of claim 13, wherein the beam scanning module is operably coupled to a mean power squared module such that the beam scanning module is arranged to perform at least one from a group of:

store squared power information associated with the at least one signal; or measure a power level from separate receive diversity paths and store squared power information associated with each processed beam as separate entries in the database.

18. The wireless network element of claim 13, further comprising a call logging module arranged to record information associated with calls in the communication cell, and an interference identification module arranged to identify interference sources by comparing call information with the values representative of incoming signal power and angle of arrival index recorded in the database.

19. The wireless network element of claim 13, wherein the wireless network element is configured to cause the vales representative of the incoming signal power and the angle of arrival index to be reported to hardware of a network operator to thereby enable the hardware of the network operator to determine areas of communication activity within the sector of the communication cell.

20. The wireless network element of claim 13, further comprising beamform processing circuitry configured to process the live network traffic in parallel with the signals received from the remote wireless communications units.

21. A wireless network element comprising:

a receiver arranged to process signals received from remote wireless communication units in a communication cell; and a beam scanning module in communication with the receiver, the beam scanning module arranged to:

control an antenna element to sweep a radiation pattern through a sector of the communication cell;

identify signal parameters representative of incoming signal power and an angle of arrival index associated with the signals received from the remote wireless communications units; and cause values representative of the incoming signal power and the angle of arrival index to be stored in a database such that the values representative of the incoming signal power and the angle of arrival index are accessible subsequent to sweeping the radiation pattern through the sector of the communication cell, wherein the receiver and the beam scanning module are arranged to operate such that live traffic processing by the wireless network element is undisrupted;

wherein the wireless network element is configured to cause the values representative of the incoming signal power and the angle of arrival index to be reported to hardware of a network operator to thereby enable the hardware of the network operator to determine areas of communication activity within the sector of the communication cell.

* * * * *